(12) United States Patent
Vasylyev

(10) Patent No.: US 12,498,107 B2
(45) Date of Patent: Dec. 16, 2025

(54) FOLDABLE ELECTRONIC DISPLAY DEVICE HAVING HIGH-DENSITY OLED ARRAY WITH TRANSPARENT REGION

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 0 days.

(21) Appl. No.: 18/928,024

(22) Filed: Oct. 26, 2024

(65) Prior Publication Data

US 2025/0052405 A1    Feb. 13, 2025

Related U.S. Application Data

(63) Continuation of application No. 18/229,174, filed on Aug. 2, 2023, now Pat. No. 12,163,648, and a
(Continued)

(51) Int. Cl.

| | |
|---|---|
| *F21V 21/14* | (2006.01) |
| *F21V 8/00* | (2006.01) |
| *F21V 9/02* | (2018.01) |
| *F21V 9/08* | (2018.01) |
| *F21V 9/30* | (2018.01) |

(Continued)

(52) U.S. Cl.
CPC ............... *F21V 21/14* (2013.01); *F21V 9/02* (2013.01); *F21V 9/08* (2013.01); *F21V 9/30* (2018.02); *F21V 13/14* (2013.01); *F21V 17/007* (2013.01); *F21V 19/003* (2013.01); *G02B 6/0055* (2013.01); *G02B 6/0068* (2013.01); *G02B 6/0073* (2013.01); *G02B 6/0083* (2013.01); *F21V 33/006* (2013.01);
(Continued)

(58) Field of Classification Search
CPC .. F21Y 2105/10; F21Y 2105/12; F21V 21/14; F21V 9/30; G02B 6/0051; G02B 6/0055; G02B 6/0073
See application file for complete search history.

(56) References Cited

U.S. PATENT DOCUMENTS

| | | |
|---|---|---|
| 6,474,836 B1 | 11/2002 | Konagaya |
| 7,374,315 B2 | 5/2008 | Dorsey et al. |

(Continued)

FOREIGN PATENT DOCUMENTS

| | | |
|---|---|---|
| WO | 2016083663 | 6/2016 |

*Primary Examiner* — Tracie Y Green

(57) ABSTRACT

An electronic display device having a layered monolithic sheet-form structure with a rectangular shape, rounded corners, a thickness under 1.5 mm, and a smooth outer surface. The layered structure includes a first optically transparent layer with Young's modulus of at least 1 GPa, a second optically transparent or translucent layer, and a third opaque heat-conductive layer. A light emitting region contains a two-dimensional pixel array of at least one million individually addressable organic light emitting diodes (OLEDs) arranged with a density of at least 300 pixels per inch across a 10-30 centimeter dimension. Each pixel contains red, green, and blue OLEDs sized from 1 to 300 micrometers. The array covers over 90% of the device area. Adhesive layers are positioned on both sides of the array. The structure has a longitudinal fold area allowing repetitive folding with a 1-5 mm radius of curvature and at least one transparent area.

36 Claims, 9 Drawing Sheets

Related U.S. Application Data continuation of application No. 17/990,081, filed on Nov. 18, 2022, now Pat. No. 11,739,923, said application No. 18/229,174 is a continuation of application No. 17/990,081, filed on Nov. 18, 2022, which is a continuation of application No. 17/739,038, filed on May 6, 2022, now Pat. No. 11,506,369, which is a continuation of application No. 17/347,521, filed on Jun. 14, 2021, now Pat. No. 11,346,534, which is a continuation of application No. 17/073,209, filed on Oct. 16, 2020, now Pat. No. 11,060,707, which is a continuation of application No. 16/549,773, filed on Aug. 23, 2019, now Pat. No. 10,830,421, which is a continuation of application No. 16/147,711, filed on Sep. 29, 2018, now Pat. No. 10,436,425, which is a continuation of application No. 15/450,015, filed on Mar. 5, 2017, now Pat. No. 10,132,478.

(60) Provisional application No. 62/393,407, filed on Sep. 12, 2016, provisional application No. 62/304,291, filed on Mar. 6, 2016.

(51) Int. Cl.
| | | |
|---|---|---|
| *F21V 13/14* | (2006.01) | |
| *F21V 17/00* | (2006.01) | |
| *F21V 19/00* | (2006.01) | |
| *F21V 33/00* | (2006.01) | |
| *F21Y 105/10* | (2016.01) | |
| *F21Y 107/70* | (2016.01) | |
| *F21Y 115/10* | (2016.01) | |
| *F21Y 115/30* | (2016.01) | |

(52) U.S. Cl.
CPC ....... *F21Y 2105/10* (2016.08); *F21Y 2107/70* (2016.08); *F21Y 2115/10* (2016.08); *F21Y 2115/30* (2016.08)

(56) References Cited

U.S. PATENT DOCUMENTS

| | | |
|---|---|---|
| 9,256,007 B2 | 2/2016 | Vasylyev |
| 9,696,010 B2 | 7/2017 | Yang |
| 9,765,934 B2 | 9/2017 | Rogers |
| 10,073,496 B2 | 9/2018 | Chen |
| 10,132,478 B2 | 11/2018 | Vasylyev |
| 10,436,425 B1 | 10/2019 | Vasylyev |
| 10,591,660 B2 | 3/2020 | Vasylyev |
| 10,694,623 B2 | 6/2020 | Park |
| 10,830,421 B2 | 11/2020 | Vasylyev |
| 10,840,464 B2 | 11/2020 | Hiroki et al. |
| 10,945,346 B2 | 3/2021 | Moon et al. |
| 11,060,707 B2 | 7/2021 | Vasylyev |
| 11,346,534 B2 | 5/2022 | Vasylyev |
| 11,506,369 B2 | 11/2022 | Vasylyev |
| 2003/0072153 A1 | 4/2003 | Matsui et al. |
| 2003/0072156 A1 | 4/2003 | Pohlert |
| 2007/0289768 A1 | 12/2007 | Moore |
| 2008/0010877 A1 | 1/2008 | Deflin et al. |
| 2008/0218369 A1 | 9/2008 | Krans et al. |
| 2009/0098789 A1 | 4/2009 | Endo |
| 2010/0002402 A1 | 1/2010 | Rogers |
| 2011/0227487 A1 | 9/2011 | Nichol |
| 2012/0320581 A1 | 12/2012 | Rogers |
| 2013/0026504 A1 | 1/2013 | Marx et al. |
| 2014/0159067 A1 | 6/2014 | Sakariya et al. |
| 2014/0254157 A1 | 9/2014 | Engelen et al. |
| 2015/0360606 A1 | 12/2015 | Thompson et al. |
| 2016/0154170 A1 | 6/2016 | Thompson |
| 2016/0197232 A1 | 7/2016 | Bour et al. |
| 2018/0375975 A1 | 12/2018 | Kikuchi |
| 2019/0079239 A1 | 3/2019 | Vasylyev |

FOLDABLE ELECTRONIC DISPLAY DEVICE HAVING HIGH-DENSITY OLED ARRAY WITH TRANSPARENT REGION

CROSS-REFERENCE TO RELATED APPLICATIONS

This application is a continuation of prior application Ser. No. 18/229,174, filed Aug. 2, 2023, which is a continuation of prior application Ser. No. 17/990,081, filed Nov. 18, 2022, which is a continuation of prior application Ser. No. 17/739,038, filed May 6, 2022, which is a continuation of prior application Ser. No. 17/347,521, filed Jun. 14, 2021, which is a continuation of prior application Ser. No. 17/073,209, filed Oct. 16, 2020, which is a continuation of prior application Ser. No. 16/549,773, filed Aug. 23, 2019, which is a continuation of prior application Ser. No. 16/147,711, filed Sep. 29, 2018, which is a continuation of prior application Ser. No. 15/450,015, filed Mar. 5, 2017, which claims priority from U.S. provisional application Ser. No. 62/393,407 filed on Sep. 12, 2016 and U.S. provisional application Ser. No. 62/304,291 filed on Mar. 6, 2016, the disclosure of which is incorporated herein by reference in its entirety.

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to illumination devices that employ compact solid-state light emitting devices such as light emitting diodes (LEDs) or laser diodes. More particularly, this invention relates to wide-area LED illumination panels. Embodiments described herein also relate to systems that incorporate such wide-area LED illumination panels, such as for example, lighting fixtures or luminaires, electronic displays, illuminated signs, traffic signs, automotive lights, and the like. Embodiments described herein further relate to methods for forming flexible LED illumination devices.

BRIEF SUMMARY OF THE INVENTION

Certain aspects of embodiments disclosed herein by way of example are summarized in this Section. These aspects are not intended to limit the scope of any invention disclosed and/or claimed herein in any way and are presented merely to provide the reader with a brief summary of certain forms an invention disclosed and/or claimed herein might take. It should be understood that any invention disclosed and/or claimed herein may encompass a variety of aspects that may not be set forth below.

According to one embodiment, a flexible solid-state illumination device is exemplified by a flexible LED illumination device having a layered sheet-form structure formed by a first flexible sheet and a second flexible sheet. The first flexible sheet is defined by a first broad-area surface and an opposing second broad-area surface that is parallel to the first broad-area surface. The second flexible sheet is optically transmissive and is defined by a third broad-area surface and an opposing fourth broad-area surface that is generally parallel to the third broad-area surface. The flexible LED illumination device further includes a plurality of LEDs mounted to the first flexible sheet and encapsulated between the first and second flexible sheets. According to some implementations, the LEDs may have rigid support substrates (submounts) that are attached to the first flexible sheet with a good thermal contact. According to some implementations, the first flexible sheet is formed from a rigid material and the second flexible sheet is formed from a soft and highly elastic material.

According to one embodiment, a method of making flexible solid-state illumination device, consistent with the present invention, includes providing a sufficiently thin, flexible and thermally conductive sheet of a rigid material, providing a plurality of LEDs, providing a flexible encapsulation sheet of an optically transmissive and preferable elastic material, mounting the LEDs to the flexible sheet of a rigid material, and encapsulating the LEDs between the flexible sheet of a rigid material and the flexible encapsulation sheet. In at least one implementation of the method, each of the LEDs is associated with a rigid substrate (submount) to which it is mounted. In one implementation, the flexible encapsulation sheet is formed by a conformal coating deposited over the plurality of LEDs in a liquid form with subsequent curing the liquid to a solid form. In one implementation, the flexible encapsulation sheet is provided in a form of a semi-cured flexible sheet that is applied to a top surface of flexible sheet of a rigid material so as to cover and hermetically encapsulate the entire plurality of LEDs.

Various implementations and refinements of the features noted above may exist in relation to various aspects of the present invention individually or in any combination. Further features, aspects and elements of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
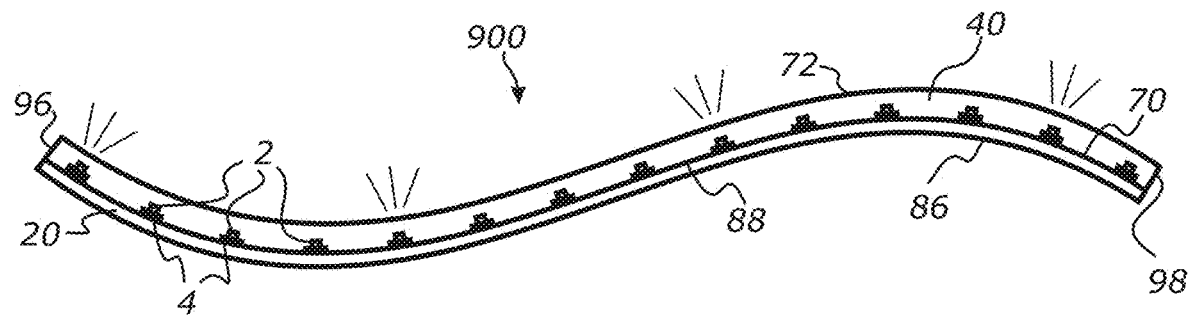
FIG. 1 is a schematic section view of a flexible LED illumination device bent to a curved shape, according to at least one embodiment of the present invention.

Referring more specifically to the drawings, for illustrative purposes the present invention is embodied in the system generally shown in the preceding figures. It will be appreciated that the system may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection and distribution of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

It is also noted that terms such as "top", "bottom", "side", "front" and "back" and similar directional terms are used herein with reference to the orientation of the Figures being described and should not be regarded as limiting this invention in any way. It should be understood that different elements of embodiments of the present invention can be positioned in a number of different orientations without departing from the scope of the present invention.

Various embodiments of the invention are directed to flexible or semi-rigid light emitting structures that employ one or more arrays of interconnected compact solid-state lighting devices distributed over a surface of and attached to a flexible or semi-rigid sheet-form support substrate. The compact solid-state lighting devices may be exemplified by light emitting diodes (LEDs) or laser diodes. The embodiments presented herein are generally described upon an exemplary case where the compact solid-state lighting devices are represented by LEDs. The light emitting structures may include various additional flexible or semi-rigid layers, such as for, example, adhesive layers, reflective layers or coatings, heat or electricity-conducting layers, or encapsulation layers.

The term "flexible", as applied to sheet-form structures (including flexible sheet-form substrates and/or layers), is generally directed to mean that such structures are capable of being noticeably flexed or bent with relative ease without breaking. It is noted that, while flexible sheet-form structures are in contrast to the ones that are rigid or unbending, the material of a sheet-form structure does not necessarily need to be soft or pliable in order to make such sheet-form structure flexible. Accordingly, the term "flexible" is directed to also include semi-rigid structures and structures that are formed by relatively hard, rigid materials such as metals or rigid plastics, when such structures have sufficiently low thickness compared to at least one their major dimension (e.g., length or width) and allow for noticeable flexing without breaking.

The LEDs may be arranged into an ordered two-dimensional array having rows and columns. The LEDs may also be distributed over a broad-area surface according to a random pattern. Each LED is mounted to the support substrate which has the ability to support the array of LEDs and associated electrical interconnects and electronic components that may be necessary for normal operation of the LED array. The sheet-form support substrate may be ordinarily formed from a rigid material, such as, for example, metal foil. Each LED may have a submount (such as, for example, a support pad or small-area rigid substrate) that is in turn attached to the sheet-form support substrate. A flexible sheet-form encapsulation layer is provided on top of the LED array to encapsulate the LEDs and optionally provide wavelength conversion. The flexible sheet-form encapsulation layer is preferably formed from an elastic material having an elastic range of at least 10%, more preferably at least 30%, even more preferably at least 50%, and still even more preferably at least 100%.

In some configurations, the encapsulation layer has a substantially uniform thickness across its entire surface. In some configurations, the encapsulation layer has a substantially uniform thickness across its surface, except for the relatively small discrete areas corresponding to individual LEDs where the thickness of the layer may be smaller than its average thickness. In some configurations, the encapsulation layer is configured as a conformal coating having a relatively constant thickness generally conforming to the relief of the LED array on the support substrate. The encapsulation layer should ordinarily provide a good bond with the support substrate so that the resulting flexible or semi-rigid structure formed by the support substrate, encapsulation layer and LEDs embedded into the encapsulation layer represents a monolithic, bendable sheet-form LED illumination panel that is resilient to repetitive bends.

In some configurations, the sheet-form support substrate is formed from a material having sufficiently high thermal conductivity to provide efficient heat spreading from LEDs. The material may be opaque and may further have a reflective surface at least in spacing areas between LEDs. The substrate may be formed from or comprise a metal foil. It may also include or be formed by a flexible printed circuit. Such flexible printed circuit may be formed by lamination of layers of a flexible plastic substrate and electrically conductive circuits. In some configurations, the sheet-form support substrate has a high-reflectance coating on the side of LEDs for recycling light that may be trapped in the encapsulation layer.

The present invention will now be described by way of example with reference to the accompanying drawings.

FIG. 1 schematically shows an embodiment of a flexible sheet-form LED illumination device 900. LED illumination device 900 includes a heat-spreading flexible support substrate 20, a plurality of rigid substrates (submounts) 4 bonded to flexible support substrate 20, a plurality of electrically interconnected inorganic light emitting diodes (LEDs) 2 bonded to respective rigid substrates 4, and a soft and flexible encapsulation layer 40 encapsulating and hermetically sealing the plurality of LEDs 2 and rigid substrates 4. LEDs 2 and respective rigid substrates 4 are evenly distributed over at least a substantial portion of the broad area of flexible sheet-form LED illumination device 900 and arranged into an ordered two-dimensional array having rows and columns. At least some or all of LEDs 2 may also be distributed over the area of flexible sheet-form LED illumination device 900 according to a different pattern, e.g., non-ordered pattern or random pattern.

According to an aspect of the embodiment illustrated in FIG. 1, LED illumination device 900 has a flexible, layered sheet-form construction formed by a first continuous broad-area layer (flexible support substrate 20) and a second continuous broad-area layer (soft and flexible encapsulation layer 40) laminated on top of the first broad-area layer. Both flexible support substrate 20 and flexible encapsulation layer 40 extend longitudinally and laterally to distances that are much greater than their thicknesses. According to an aspect, flexible support substrate 20 and flexible encapsulation layer 40 are formed by thin and flexible sheets. Such thin and flexible sheets are bonded together to form a monolithic sheet-form structure of flexible LED illumination device 900 which is generally free from voids or air spaces. LEDs 2 are embedded into the solid material of flexible encapsulation layer 40 and attached or otherwise mounted to flexible support substrate 20 with a good mechanical and thermal contact. According to one embodiment, LEDs 2 may be exemplified by micro-LEDs or elemental LED chips that are attached either directly or indirectly to flexible support substrate 20 and have sizes on the scale of 1 µm to 300 µm.

Flexible support substrate 20 is formed by a continuous solid sheet of tough, heat-conducting material and has a relatively low thickness so that the substrate can be easily flexed. The sheet preferably has a constant thickness across its entire area. Flexible support substrate 20 may be formed by a single material, a blend of different materials or a layered laminate of different materials. Flexible support substrate 20 is preferably formed from a rigid material or includes at least one layer of a rigid material.

According to one embodiment, flexible support substrate 20 has at least one layer that is formed from a material having a thermal conductivity of at least 50 W/mK, more preferably at least 100 W/mK, even more preferably at least 150 W/mK, and still even more preferably at least 200 W/mK. According to one embodiment, flexible substrate 20 is a laminate including a metallic heat-spreading layer which has a relatively low thickness for flexibility. The metallic layer or substrate should preferably have a thickness below 1 mm, more preferably below 0.5 mm, even more preferably below 0.3 mm, and still even more preferably below 0.2 mm. According to one embodiment, flexible support substrate 20 incorporates a thin aluminum or copper foil having a thickness between 30 µm and 150 µm.

Flexible substrate 20 is ordinarily opaque (formed by an opaque material) but may also include openings or transparent/translucent areas serving different purposes. One or more layers forming flexible substrate 20 may be transparent or perforated. According to an alternative embodiment, the entire flexible substrate 20 or at least a substantial portion of its broad area may be transparent or translucent. The entire flexible LED illumination device 900 or one or more of its portions may be made substantially transparent or translucent.

Flexible support substrate 20 is defined by a top broad-area surface 88 and an opposing bottom broad-area surface 86 extending parallel to top surface 88. Flexible support substrate 20 ordinarily has a substantially constant thickness.

Top surface 88 includes a highly reflective layer which may be of a specular or diffuse reflection type. It is preferred that surface 88 has a hemispherical reflectance considerably greater than 50%, more preferably greater than 70%, even more preferably greater than 80%, and still even more preferably greater than 85%.

When flexible substrate 20 is formed from metal, somewhat good reflectance of surface 88 may be obtained by means polishing such surface to a high gloss. Alternatively, surface 88 may be mirrored for high specular reflectance, laminated with a reflective polymeric film, or coated with a high-diffuse-reflectance material.

Surface 86 may include a high-emissivity coating configured to enhance radiative heat transfer from flexible substrate 20 to the surrounding medium (such as air). The emissivity is conventionally defined as the ratio of the energy radiated from a surface to the energy radiated from an ideal blackbody emitter under the same conditions. For example, when flexible support substrate 20 or at least its outermost layer exposed to the ambient air is made of thin-sheet aluminum, surface 86 may be anodized to increase the emissivity from 3-10% (typical for unfinished aluminum) up to 75-85%. In a further example, flexible support substrate 20 may be spray-coated with a thin layer of dielectric paint having a relatively high emissivity. According to one embodiment, the emissivity of surface 86 at normal operating conditions of flexible LED illumination device 900 is more than 85%, more preferably more than 90%, and even more preferably more than 95%.

Flexible support substrate 20 may include additional functional and/or decorative layers, which may include electrical insulation materials, electro conductive materials, heat conducting materials, paper, plastic films, PCB materials, structurally reinforcing materials, meshes, fabrics, paint, colorants, and adhesive materials. Such layers may extend over the entire area of substrate 20 or any portion of it.

Flexible support substrate 20 may include at least one electrically insulating layer disposed on top of a heat-spreading layer. The material of such electrically insulating layer should preferably have a sufficiently high thermal conductivity to effectively transfer heat from LEDs 2 (or rigid substrates 4) to the heat-spreading layer underneath. Alternatively, the electrically insulating layer should have a sufficiently low thickness to minimize a thermal resistance of the layer. In one embodiment, flexible support substrate 20 may include polyimide film.

When flexible substrate 20 is formed by multiple layers including a heat-spreading metallic layer, a total thickness of the substrate may considerably exceed a thickness of such metallic layer. Still, it is preferred that substrate 20 maintains sufficient flexibility even with all such layers employed. According to one embodiment, flexible sheet-form LED illumination device 900 is configured such that it exhibits notable flexing under gravity when suspended in a horizontal orientation and supported only in a mid-section of the respective sheet form. Flexible support substrate 20 may include a sheet material that has sufficient rigidity at the selected thickness to provide flexing in an elastic regime and allowing the substrate to restore its shape when the external force is removed. Such sheet may also provide some spring action and notable resistance to flexing.

According to an aspect of the embodiments illustrated in FIG. 1, flexible support substrate 20 is configured to remove thermal energy from individual LEDs 2 and spread such thermal energy both longitudinally and laterally in a plane of the substrate in response to thermal conduction. The thermal conductivity of flexible support substrate 20 may be selected such that at least a substantial part of the thermal energy is distributed across the entire continuous area of the substrate and can be efficiently dissipated from broad-area surface 86.

Flexible encapsulation layer 40 is formed by a broad-area sheet of an optically transmissive material and defined by a bottom surface 70 and an opposing top surface 72 extending generally parallel to surface 70. Flexible encapsulation layer 40 is configured to redistribute and spread at least a portion of light energy emitted by highly compact, discrete LEDs 2 across a much larger surface for an enhanced brightness uniformity and masking the bright spots produced by such LEDs 2. In addition, flexible encapsulation layer 40 may be configured to conduct waste heat through its volume and dissipate such heat via surface 72. Although optically transmissive dielectric materials that can be utilized for flexible encapsulation layer 40 generally provide much fewer options for efficient heat conduction compared to, for example, metallic materials that can be utilized for flexible support substrate 20, the encapsulation layer may nevertheless be configured to dissipate at least a smaller portion of waste thermal energy generated by LEDs 2.

Flexible LED illumination device 900 may be configured to dissipate heat generated by LEDs 2 using both radiative heat transfer and natural convection. Both of surfaces 72 and 86 defining the outer boundaries of the sheet-form structure of flexible LED illumination device 900 may be configured for efficient heat dissipation to the environment so that the effective heat-dissipating area of the device can be twice the area of the respective sheet-form structure.

According to one embodiment, LEDs 2 are evenly distributed over the entire light-emitting area of flexible sheet-form LED illumination device 900 and configured to consume a limited amount of electric power per unit area, within a predetermined range, and, subsequently, emit a limited amount of light energy per unit area. Such range may be selected such that flexible LED illumination device 900 emits a sufficient amount of light for the intended purpose and yet can be operated continuously without overheating when using only natural convection and direct radiation heat transfer as the primary means for heat dissipation. More particularly, the operating range of electric power consumption may be selected such that the waste heat generated by LEDs 2 can be effectively dissipated only through the exposed areas of flexible LED illumination device 900 while keeping the temperature of the device below a prescribed level (e.g., less than 20° C. above ambient, less than 30° C. above ambient, or less than 40° C. above ambient).

The heat energy generated by LEDs 2 and received by the laminate of flexible support substrate 20 and flexible encapsulation layer 40 is defined by the amount of electric energy consumed by LEDs 2 and the efficiency with which such LEDs 2 and the overall structure of flexible LED illumination device 900 converts electrical power into optical power. Accordingly, a maximum allowed density of the heat flux flowing through heat-dissipating surfaces may be determined by the design of flexible LED illumination device 900 and the electric power consumed by the device per its unit area.

The electric consumption of flexible LED illumination device 900 or any its portion may be expressed in terms of an operational areal electric power density and measured in watts of consumed electric energy per square meter of the respective light emitting area. For example, when flexible LED illumination device 900 is configured as a thin broad-area sheet with a continuous light emitting area having a length and width dimensions of 1 m and 0.5 m, respectively, and is further configured to consume 100 W of nominal electric power when in normal operation, an average operational areal electric power density of the device is 200 W/m². Considering that LEDs 2 may be dimmable, a nominal electric power consumed by flexible LED illumination device 900 may be defined as a product of electric current and voltage delivered to the device without any dimming.

According to one embodiment, an average operational areal electric power density of flexible LED illumination device 900 is between a minimum of 50 W/m² and a maximum of 1500 W/m². According to one embodiment, the average operational areal electric power density is between 75 W/m² and 1000 W/m². According to one embodiment, the average operational areal electric power density is between 100 W/m² and 500 W/m².

According to one embodiment, the operational areal electric power is substantially constant across the entire light emitting area of flexible LED illumination device 900. Local operational areal electric power density at a specific point location of flexible LED illumination device 900 may be defined as an average of operational areal electric power density of a sampling area surrounding such point location. The dimensions of the sampling area may be selected based on the size of flexible LED illumination device 900. In one embodiment, the sampling area may have dimensions that are about $\frac{1}{10}^{th}$ of the respective dimensions of flexible LED illumination device 900. For example, when the entire active light emitting area of flexible LED illumination device 900 has a size of 500 mm by 500 mm, the sampling area may have dimensions of 50 mm by 50 mm. Each sampling area and may include a relatively large number of LEDs 2 (e.g., 50, 100 or more).

The number of LEDs 2 and the amount of light produced by each LED 2 may be selected such that the operational areal electric power density does not exceed the prescribed values, as described above. Depending on the luminous efficacy of LEDs 2 (commonly expressed in lumens per Watt) and optical efficiency of the sheet-form light emitting structure formed flexible support substrate 20 and flexible encapsulation layer 40, a luminous emittance of flexible LED illumination device 900 may also be limited by a practical range. Luminous emittance (luminous exitance) is commonly defined as the luminous flux emitted from a surface per unit area and is conventionally measured in lumens per square meter (lm/m²). According to one embodiment, flexible LED illumination device 900 is configured to have a luminous emittance between 2500 lm/m² and 250000 lm/m². According to one embodiment, flexible LED illumination device 900 has a luminous emittance between 3000 lm/m² and 150000 lm/m². According to one embodiment, flexible LED illumination device 900 has a luminous emittance between 5000 lm/m² and 75000 lm/m². According to one embodiment, flexible LED illumination device 900 has a luminous emittance between 10000 lm/m² and 50000 lm/m². According to one embodiment, flexible LED illumination device 900 has a luminous emittance between 10000 lm/m² and 25000 lm/m².

According to one embodiment, flexible LED illumination device 900 is configured as an opaque, continuous, monolithic solid sheet emitting light from one side through surface 72. Flexible LED illumination device 900 may be further configured such that there are generally no optical boundaries between at least some of LEDs 2 embedded into flexible encapsulation layer 40. Each individual LED 2 may be disposed in energy exchange relationship with respect to one or more adjacent LEDs 2. According to one embodiment, each individual LED 2 is disposed in energy exchange relationship with respect to at least several other LEDs 2 surrounding such individual LED 2. The optically transmissive material of flexible encapsulation layer 40 can be configured to operate as a light-carrying medium and conducting light from one LED 2 to another. Flexible LED illumination device 900 may be further configured such that it can be flexed, bent or folded in spacing areas between LEDs 2 disposed in energy exchange relationship with each other.

Surface portions of rigid substrates 4 may be exposed to light propagating within flexible encapsulation layer 40. Accordingly, such exposed surface portions may be made reflective to reduce the light loss within flexible LED illumination device 900. According to one embodiment, surface area surrounding each LED 2 may be configured to receive light emitted by one or more other LEDs 2, such as the adjacent LEDs 2.

According to one embodiment, each LED 2 is represented by an individual inorganic LED chip or die. Such inorganic LED chips or dies are distributed over a broad area of flexible substrate 20 and bonded or otherwise mounted to surface 88 with a good mechanical and thermal contact that allows for efficient heat transfer from the LED chips to the substrate.

According to one embodiment, each LED 2 may also include a cluster of LED chips or dies. In one implementation, each LED chip in the cluster may be configured to emit light in the same color, such as "royal blue" for example. In an alternative implementation, each LED chip in the cluster may be configured to emit light in a different color. In a non-limiting example, each individual LED 2 may be configured as an RGB LED and include a multi-color cluster of 3 LED chips (Red, Green, and Blue). At least one of the LED clusters may also include a white-color LED.

According to one embodiment, the plurality of LEDs 2 is formed by a large two-dimensional array of inorganic LED chips evenly distributed over surface 88 and having alternating colors. For example, the alternating colors may be red, green, blue, and white. The multi-color LED chips may be distributed according to any suitable pattern. In a non-limiting example, each white-color LED may be surrounded by red, green, and blue LEDs or LED chips disposed equidistantly from such white-color LED.

Referring further to FIG. 1, each LED 2 is mounted (e.g., bonded) to rigid substrate 4 with a good mechanical and thermal contact. In turn, rigid substrate 4 is bonded to the reflective side (surface 88) of flexible substrate 20 with a good mechanical and thermal contact. According to an aspect of the embodiments illustrated in FIG. 1, each rigid substrate 4 represents a generally undeformable (under normal operation of flexible LED illumination device 900) pad upon which LED 2 is residing.

According to one embodiment, each rigid substrate 4 supports a single LED 2. Each rigid substrate 4 may have a width and length dimensions approximating those of the respective LED 2. Alternatively, rigid substrates 4 may have slightly or considerably greater dimensions than those of LED 2.

According to one embodiment, each rigid substrate 4 supports multiple LEDs 2. For example, two, three, four, or more LED chips may be mounted to substrate 4 at different locations of its surface. According to one embodiment, such LED chips may have the same light emission color. According to an alternative embodiment, such LED chips may have different light emission colors.

Each rigid substrate 4 should preferably have a considerably greater stiffness than flexible support substrate 20. It may be also configured to have a sufficient thickness to prevent its deformations when flexible substrate 20 is bent or flexed during the normal operation of LED illumination device 900 or during normal handling of the device. By way of example, each rigid substrate 4 can be made from a rigid and stiff ceramic material such as alumina, aluminum nitride, or silicon carbide and should preferably have a high thermal conductivity. Various layers of rigid substrate 4 may include crystalline materials such as sapphire or silicon, various polymeric or metallic layers, and/or a printed circuit board (PCB).

Each rigid substrate 4, as a whole, is ordinarily opaque. However, it may also be transparent, translucent or incorporate one or more optically transmissive layers. According to one embodiment, each rigid substrate 4 has a highly reflective surface. In one embodiment, each rigid substrate 4 incorporates one or more other substrates, pads or submounts that have various thicknesses. In one embodiment, each rigid substrate 4 incorporates a solder mask. In one embodiment, each rigid substrate 4 incorporates two or more electrical contacts used for interconnecting LEDs 2 in the array.

It is noted that LEDs 2 may be represented by unpackaged (uncased) LEDs or LED chips that are attached or otherwise mounted to flexible support substrate 20 either directly or indirectly using any suitable method. For example, flexible support substrate 20 may be formed by a flexible circuit board (PCB) having a 0.3-1 mm thickness and LEDs 2 may be bonded directly to such PCB using a Chip-On-Board (COB) technique. In a further non-limiting example, flexible support substrate 20 may be formed by a film-thickness flexible PCB substrate having a 0.03-0.3 mm thickness and LEDs 2 may be mounted directly to such flexible PCB substrate using a Chip-On-Film (COF) technique. According to an aspect of such exemplary implementations, the sheet-form structure formed by LED illumination device 900 may represent a single, large-area, flexible package for otherwise unpackaged LEDs 2.

The thickness of flexible encapsulation layer 40 is preferably greater than the height of individual LEDs 2. According to different embodiments, the thickness of flexible encapsulation layer 40 is at least two times, at least three times, and at least four times greater than the height of individual LEDs 2.

The thickness of flexible encapsulation layer 40 may also be greater than the size of individual LEDs 2 measured in a plane parallel to the surface of flexible sheet-form LED illumination device 900. According to one embodiment, a combined thickness of flexible encapsulation layer 40 and flexible support substrate 20 is greater than such size of individual LEDs 2.

According to an aspect of the embodiments schematically illustrated in FIG. 1, the array of LEDs 2 assembled on a common flexible support substrate 20 forms elevated mesa structures on otherwise smooth and planar surface 88. Flexible encapsulation layer 40 fully covers/encapsulates such mesa structures, covering the exposed sides of the respective LED dies, and levels the surface of flexible LED illumination device 900.

The material of flexible encapsulation layer 40 is disposed in contact with the bodies of each LED 2 on all sides so that there is generally no air spaces between such LED 2 and the material of flexible encapsulation layer 40. The material of flexible encapsulation layer 40 is also particularly disposed in contact with the light emitting surface of each LED 2. When LED 2 is formed by a LED die mounted to a substrate and protruding away from the mounting surface of such substrate, flexible encapsulation layer 40 should fully encapsulate such LED die so that the is substantially no air gap between LED die and the material of flexible encapsulation layer 4.

According to an aspect, flexible encapsulation layer 40 having a good, gapless optical contact with the light emitting area of LED 2 may improve light extraction from the light emitting layer(s) of LED 2, e.g., by suppressing TIR within such light emitting layer(s) at least for some light propagation angles.

According to one embodiment, flexible encapsulation layer 40 is configured as a gapless conformal coating over flexible support substrate 20 and mesa structures formed by LEDs 2. In this case, top surface 72 of flexible encapsulation layer 40 may have a generally constant or near-constant thickness over its entire area featuring somewhat smoothened surface bumps corresponding to LEDs 2. Such surface bumps (not shown in FIG. 1, but see, e.g., FIG. 17) may have the shape of spherical or quasi-spherical lenses. Such lenses may be configured to assist in light extraction from flexible encapsulation layer 40 and/or redistributing light emitted from surface 72 (e.g., collimating the emergent light rays).

The thickness of flexible encapsulation layer 40 is preferably very low compared to its major dimensions (e.g., length and width for a rectangular shape or a diameter for a round shape). According to one embodiment, a thickness of flexible encapsulation layer 40 is less than 0.01 of a smallest major dimension of the layer. According to one embodiment, a thickness of flexible encapsulation layer 40 is less than 0.001 of a major dimension of the layer.

Flexible encapsulation layer 40 is made from a heat-resistant, optically transmissive dielectric material. The material may be optically clear but may also have some tint or haze while providing some transparency. Such material should also preferably be relatively soft, highly flexible, and have good elasticity.

Flexible encapsulation layer 40 is preferably configured to allow for its reversible distortion or deformation when bending or folding flexible LED illumination device 900. In one embodiment, the material is silicone. In alternative embodiments, the material of flexible encapsulation layer 40 may be selected from various elastomeric compounds or resins that provide sufficient flexibility, softness, gas/moisture impermeability and resistance to high temperatures associated with LED encapsulation.

According to one embodiment, a hardness of the material of flexible encapsulation layer 40 is between durometer hardness values of 10 Shore A and 90 Shore A (as measured in accordance with ASTM D2240 type A scale). According to one embodiment, the material of flexible encapsulation layer 40 has a hardness between 25 Shore A and 85 Shore A. According to one embodiment, the material of flexible encapsulation layer 40 has a hardness between 30 Shore A and 65 Shore A.

Flexible encapsulation layer 40 may include a light diffusing material. For example, such light diffusing material may incorporate light scattering particles distributed throughout its volume and causing light rays propagating through encapsulation layer 40 to randomly change their propagation directions.

Flexible encapsulation layer 40 may further include a luminescent material or phosphor used to change the light emission spectrum. For example, the light emitting chips of LEDs 2 may be configured to emit a blue light and a YAG phosphor may be employed to convert such blue light to a white light. The phosphor material may be mixed with silicone or other material that forms flexible encapsulation layer 40. Various types of light scattering and/or luminescent particles may be distributed throughout the volume of flexible encapsulation layer 40 with a constant density or variable density. For example, the density may be higher in the areas immediately surrounding LEDs 2 and lower in spacing areas between LEDs 2.

Flexible encapsulation layer 40 may be deposited directly over LEDs 2 in a liquid form, for example, by spraying, dispensing, or other suitable means. The liquid form may include a mix of light scattering particles and/or a luminescent material. Flexible encapsulation layer 40 may also be preformed as a molded sheet and then applied to surface 88 so as to cover and encapsulate LEDs 2.

One or more LEDs 2 may be coated with a phosphor material configured to absorb at least some of light emitted by such LEDs 2 and to re-emit at least a portion of the absorbed light in a different wavelength. An area of flexible encapsulation layer 40 directly above LEDs 2 may be coated with such a phosphor material.

According to one embodiment, flexible encapsulation layer 40 has a layered configuration and includes an inner optically transparent layer contacting surface 88 and LEDs 2 and an outer remote phosphor layer spaced by a distance from the layer of LEDs 2 and including a wavelength converting material. LED illumination device 900 may be further provided with one or more reflective surfaces that are flanking flexible encapsulation layer 40 and prevent light leakage through the sides (edges) of the layer. For example, opposing surfaces 96 and 98 that define side edges of flexible encapsulation layer 40 may be made reflective. Surfaces 96 and 98 may extend perpendicularly to surface 72. Alternatively, surfaces 96 and 98 may extend at an angle other than 90° with respect to surface 72

The stiffness and hardness of flexible encapsulation layer 40 should ordinarily be significantly less than those of flexible substrate 20. According to different embodiments, flexible encapsulation layer 40 is formed by an elastomeric material and the flexural rigidity of such elastomeric encapsulation layer 40 is less than ⅕, less than 1/10, less than 1/20, and less than 1/50 of the flexural rigidity of flexible support substrate 20.

Furthermore, according to at least one embodiment, it is preferred that the material of flexible encapsulation layer 40 is highly elastic (rubber-like). In particular, such material should have sufficient elasticity to reversibly accommodate localized compression and/or elongation deformations during bending of the sheet-form structure of LED illumination device 900. The material should allow for a repeated compression and/or stretching to a considerable relative compression or elongation with an ability to return to their approximate original length and shape when stress is released. The material should also be sufficiently soft and not brittle to allow for such deformations. Furthermore, the material may be configured to allow a dynamic flexing in response to the externally applied force without tearing, breaking or substantial irreversible deformations.

An elastic range of a material may be defined as the maximum deformation (or strain) at which a material reaches its yield strength (or the so-called proportional limit). In other words, the elastic range represents the maximum deformation (e.g., elongation along a length direction) of the material at which the material is still capable to return to its approximate original dimensions using its elastic properties after the stress is removed. The elastic range may be expressed in terms of a relative elongation of the material with respect to its original length. In other words, a material having an elastic range of 10% should allow for a reversible stretch elongation of at least 10% relatively to its original length. The elasticity of the material may also be described by a modulus of elasticity, which is also known as an elastic modulus or Young's modulus.

According to one embodiment, the material of encapsulation layer 40 has an elastic range of at least 10%. In other words, the material should allow for a reversible stretch elongation of at least 10% relatively to its original length. According to various embodiments, the material of encapsulation layer 40 has an elastic range of at least 20%, at least 30%, at least 50%, and at least 100%.

It is preferred that the material of flexible encapsulation layer 40 has an elastic range which is much greater than that of flexible substrate 20. According to one embodiment, the elastic range of flexible encapsulation layer 40 is at least 10 times greater than the elastic range of flexible substrate 20.

It is further preferred that a Young's modulus of the material of flexible encapsulation layer 40 is much lower than a Young's modulus of the material of flexible substrate 20. According to one embodiment, a Young's modulus of flexible encapsulation layer 40 is at least 100 times less than that of flexible substrate 20. According to one embodiment, flexible substrate 20 is formed by a material having a Young's modulus of at least 1 GPa and the material of flexible encapsulation layer 40 has a Young's modulus less than 10 MPa and may further have an elastic range of at least 50%, and preferably 100% or more.

It is yet further preferred that the material of flexible encapsulation layer 40 can maintain its elastic range and Young's modulus at elevated temperatures (e.g., above 40° C. and more preferably above 60° C.) during the light-emitting operation of flexible LED illumination device 900.

It may also be generally preferred that a thickness of flexible substrate 20 is considerably less than a thickness of flexible encapsulation layer 40, but is still sufficient to sustain normal flexing of LED illumination device 900 without rupturing the substrate. Flexible substrate 20 and encapsulation layer 40 may each have a generally constant thickness so that flexible LED illumination device 900 may have a generally constant or near-constant thickness across its entire area. The strength of a bond between flexible support substrate 20 and highly flexible encapsulation layer 40 laminated together should be sufficiently high to prevent delamination and/or debonding during repetitive flexing or bending the flexible LED illumination device 900.

A relatively high elasticity of flexible encapsulation layer 40 may be advantageously selected for configurations of flexible LED illumination device 900 in which relatively small bend radii of the panel may be required. For example, LED illumination device 900 may be configured to be bendable to a radius of surface curvature of 30-100 mm, rollable with a radius of surface curvature of 5-30 mm, or even foldable with a radius of surface curvature of 1-5 mm or even less. The material of flexible encapsulation layer 40 should be capable to accommodate such tight bends which may result in material stretching and/or compression and may also result in reversibly changing the thickness of such layer in the respective areas of bends or folds.

Figure 2:
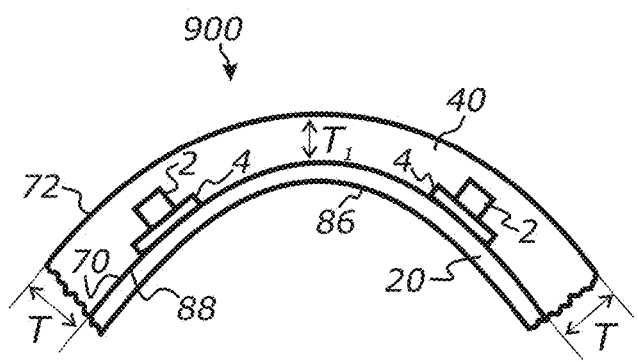
FIG. 2 is a schematic section view of a flexible LED illumination device portion, showing a reduced thickness of a flexible encapsulation layer in an area of a bend, according to at least one embodiment of the present invention.
Figure 3:
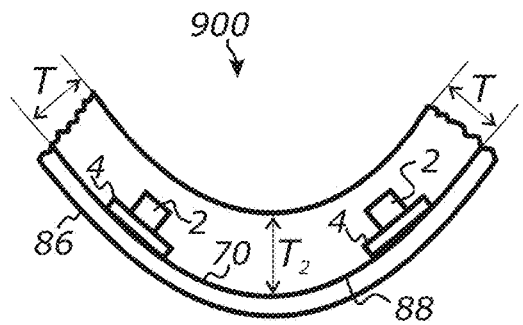
FIG. 3 is a schematic section view of a flexible LED illumination device portion, showing an increased thickness of a flexible encapsulation layer in an area of a bend, according to at least one embodiment of the present invention.

This is further illustrated in FIG. 2 and FIG. 3 schematically showing a portion of flexible LED illumination device 900 that is bent or folded to a relatively small bend radius in respect to the thickness of the respective sheet.

FIG. 2 schematically illustrates a portion of flexible LED illumination device 900 that is flexed outwardly with respect to its light emitting surface or side. Flexible support substrate 20 having an average thickness T has a much greater resistance to compression- and elongation-type deformations compared to encapsulation layer 40. On the other hand, the relatively high softness and elasticity of encapsulation layer 40 allows such layer to absorb most of the stress induced by flexing. Such flexural stress may cause the material of flexible encapsulation layer 40 to reversibly stretch in the area of a bend and form a reduced thickness $T_1$ in such area ($T_1$<T). Conversely, when flexible LED illumination device 900 is bent inwardly with respect to the light emitting side (FIG. 3), flexible encapsulation layer 40 may form a thickness $T_2$ in the area of the bend which is greater than the average thickness T.

According to one embodiment, rigid substrates 4 underneath LEDs 2 may be provided with a sufficiently high stiffness/rigidity so that they locally increase the stiffness of flexible LED illumination device 900 at the respective areas. This may ensure that flexible support substrate 20 (and the entire sheet-form LED illumination device 900) can only flex in the spacing areas between LEDs 2 thus helping preserve the integrity of LEDs 2 and their good mechanical and thermal contact with the substrate.

According to some embodiments, the material of flexible support substrate 20 may also have some elasticity and ability to reversibly stretch or compress. According to one embodiment, the entire flexible sheet-form LED illumination device 900 is made stretchable.

Surface 72 of flexible encapsulation layer 40 may include various features that provide certain distinct optical properties for flexible LED illumination device 900. According to one embodiment, surface 72 is smooth and has a glossy appearance. According to one embodiment, surface 72 may be textured and provided with a matte finish, for example, for enhancing light extraction from flexible encapsulation layer 40 and/or reducing reflection glare from surface 72. The entire surface 72 may be textured. Alternatively, only select locations of surface 72 may be textured. For example, surface 72 may be textured in areas corresponding to the locations of LEDs 2, while spacing areas between LEDs 2 can be made smooth and texture-free. In a further example, surface 72 may be selectively textured according to any suitable geometrical, ornamental, or random pattern.

According to one embodiment, surface 72 may be provided with a hard coat (e.g., 6H to 9H on the Mohs scale of hardness) to protect flexible encapsulation layer 40. Flexible LED illumination device 900 may further include a light diffusing sheet or layer positioned on top of flexible encapsulation layer 40 and having light diffusing surface microstructures and/or light diffusing particles embedded into the sheet material. Such light diffusing sheet or layer may be configured to mask surface brightness variations produced by discrete LEDs 2. Flexible encapsulation layer 40 may also be sandwiched between flexible support substrate 20 made from a sufficiently thin but rigid material and a flexible protective top sheet made from a thin, rigid, and optically transmissive material. Such protective top sheet may configured for a generally unimpeded light passage and for protecting the underlying flexible encapsulation layer 40 from mechanical or chemical damage. It should also have sufficiently low thickness and high flexibility to allow bending flexible LED illumination device 900 with relative ease.

According to one embodiment, LED illumination device 900 has a configuration of a thin and flexible sheet or panel having a broad, continuous light emitting area. According to different embodiments, at least the largest dimension of the sheet is greater than a thickness of the sheet by at least 20 times, at least 50 times, and at least 100 times. According to one embodiment, LED illumination device 900 forms a continuous flexible light emitting sheet that broadly extends both longitudinally and laterally such that each of the major dimensions (length and width) of the sheet is greater than a thickness of the sheet by at least 100 times. The sheet may have a substantially constant thickness defined by surface 72 and opposing surface 86 extending parallel to surface 72. According to different embodiments, a spacing distance between LEDs 2 in the array is greater than a thickness of the sheet by at least 2 times, at least 3 times, at least 5 times, and at least 10 times.

A spacing distance between LEDs 2 is preferably much greater than the size of individual LED dies forming such LEDs 2. According to different embodiments, a spacing distance between LEDs 2 in the array is greater than the die size (or diameter) by at least 5 times, at least 10 times, and at least 15 times.

According to different embodiments, flexible LED illumination device 900 has a two-dimensional sheet-form configuration with each of the major dimensions (e.g., length and width) of the continuous light emitting area being greater than 100 mm, greater than 250 mm, greater than 0.5 m, and greater than 1 m.

The overall thickness of the flexible sheet or panel formed by LED illumination device 900 may vary broadly from about 50 µm to several millimeters while its overall size may be as large as several meters across. In applications requiring enhanced flexibility and compactness, such thickness should preferably be less than 3 mm, more preferably less than 1.5 mm, even more preferably less than 1 mm, even more preferably less than 0.75 mm and still even more preferably less than 0.5 mm.

The LED array may cover a substantial portion of the area of flexible support substrate 20. According to different embodiments, the two-dimensional array of LEDs 2 may cover more than 50%, more than 75%, more than 90%, and more than 95% of the area of flexible support substrate 20. Flexible LED illumination device 900 may be configured to be bendable and/or foldable in either direction. More particularly, flexible LED illumination device 900 having a rectangular configuration may be bendable and/or foldable along both length and width dimensions.

LED illumination device 900 may incorporate a fairly large number of LEDs 2 mounted on a single large-format flexible substrate 20 and encapsulated by continuous, large-area flexible encapsulation layer 40. According to one embodiment, such LED illumination device 900 incorporates at least 1,000 LEDs 2. According to one embodiment, such LED illumination device 900 incorporates at least 10,000 LEDs 2. According to one embodiment, such LED illumination device 900 incorporates at least 100,000 LEDs 2. It should also be understood that LED illumination device 900 may incorporate even much greater numbers of LEDs, depending on its size and the density of LEDs 2. For example, a relatively large-area LED illumination device 900 may incorporate millions, tens of millions, hundreds of millions, and even billions of LEDs 2 or elemental inorganic LED dies distributed over such area. The average spacing distance between LEDs 2 in the two-dimensional array may vary in a broad range. In some embodiments, such spacing distance can be between 50 µm and 100 µm, between 100 µm and 250 µm, between 250 µm and 0.5 mm, between 0.5 mm and 1 mm and, between 1 mm and 5 mm, and above 5 mm.

According to some embodiments, LEDs 2 may be positioned in the array at a sufficiently small pitch that allows a human's eye to see two or more adjacent LEDs (which may also be regarded as pixels in a digital screen) as one LED or pixel (making such adjacent LEDs unresolvable as separate bright spots). According to one aspect, LEDs 2 may be spaced from each other according to a concept similar to spacing pixels in a digital LCD display which resolution is commonly characterized in terms of Pixels Per Inch (PPI) or Dots per Inch (DPI). Accordingly, depending on the designed viewing distance, the spacing of LED 2 in flexible LED illumination device 900 may be designed to correspond to certain "standard" resolutions, e.g., 72 DPI, 144 DPI, 300 DPI, 600 DPI, 1000 DPI, etc. However, any other suitable spacing within or outside of such range of DPI may be selected. When applied to large-area illuminated displays that are to be viewed from a considerable distance, the effective DPI may be as low as 1, 0.1, 0.01 or even less.

When illuminated, significant portions of LED illumination device 900, such as the spacing areas between LEDs 2, may have significantly reduced brightness compared to the areas that correspond to LEDs 2. At the same time, the spacing between LEDs 2, and the respective DPI, may be selected such that flexible LED illumination device 900 appears as a broad-area light-emitting surfaces having a substantially uniform brightness when viewed by an observer at a distance (with the "pixels" corresponding to individual LEDs 2 unresolvable by a human's eye). The designed observation distance depends on the size and the use of the device in which flexible LED illumination device 900 is incorporated (e.g., mobile electronic displays: 10-30 cm, computer monitors: 25-50 cm, television or advertising displays: 1-5 meters or more). According to at least one embodiment, a spacing distance between LEDs can be less than a thickness of flexible encapsulation layer 40.

Each LED 2 may be configured to consume a limited amount of electrical power and consequently emit a limited amount of light so that flexible LED illumination device 900 may be operated without any heat sinks or additional heat dissipating elements, using only natural convection and direct radiative heat transfer. As discussed above, this can be achieved by maintaining an average operational areal electric power density of the device below a certain maximum level. As a matter of physics, a sheet-form structure that is suspended in air and has reached a steady isothermal state can dissipate a certain maximum amount of thermal power per unit area using only natural convection and direct radiation heat transfer. For example, it can be shown that, in order to maintain a temperature differential between the ambient air and the surface of a sheet-form structure below 30° C. in such a regime, the density of heat flux received by such sheet-form structure should be generally below 700-1000 W/m². On the other hand, it is noted that the maximum heat flux density allowed for a free-standing configuration of flexible LED illumination device 900 may also be slightly more or slightly less, depending on the exact implementation of the device and the materials used for its construction. At least in some applications requiring a lower temperature differential relatively to the ambient air, or, for example, to ensure that a junction temperature characterizing LEDs 2 is below a certain maximum value, the maximum heat flux density may be further reduced to values between 100 W/m² and 500 W/m².

Furthermore, considering that commercially available LEDs convert only a portion of electric energy into useful light and that some of the emitted light may also be lost within the layered sheet-form structure formed by flexible support substrate 20 and flexible encapsulation layer 40, flexible LED illumination device 900 is expected to convert from 30% to 70% of the electric energy into heat, depending on its particular configuration and design. Accordingly, it may be possible to define a maximum nominal power consumption $P_{LED\_MAX}$ per individual LED 2 depending on an average distribution density $D_{LED}$ of LEDs 2 over the area of flexible LED illumination device 900. The following equation may be used to describe a relationship between $P_{LED\_MAX}$, $D_{LED}$ and a nominal operational areal electric power density PA of flexible LED illumination device 900:

$$P_{LED\_MAX} = P_A/D_{LED}.$$

For example, when a designed PA of flexible LED illumination device 900 is 400 W/m², $D_{LED}$ is 40000 LEDs/m² (one LED 2 every 5 mm of the device's area, on average), the maximum power $P_{LED\_MAX}$ allowed for each LED 2 can be 0.01 W. According to different embodiments, flexible LED illumination device 900 is configured for natural convection and has $P_{LED\_MAX}$ that is less than 500/$D_{LED}$.

It is noted that flexible LED illumination device 900 may be configured for enhanced natural convection (e.g., by increasing the surface area of flexible support substrate 20). It may also be designed for the use with a forced convection (e.g., by employing an air-circulating fan). Furthermore, flexible LED illumination device 900 may be made attachable to a heat-dissipating structure that provides a more efficient heat removal compared to the interface between surface 86 and ambient air. This is illustrated in FIG. 4 and FIG. 5.

Figure 4:
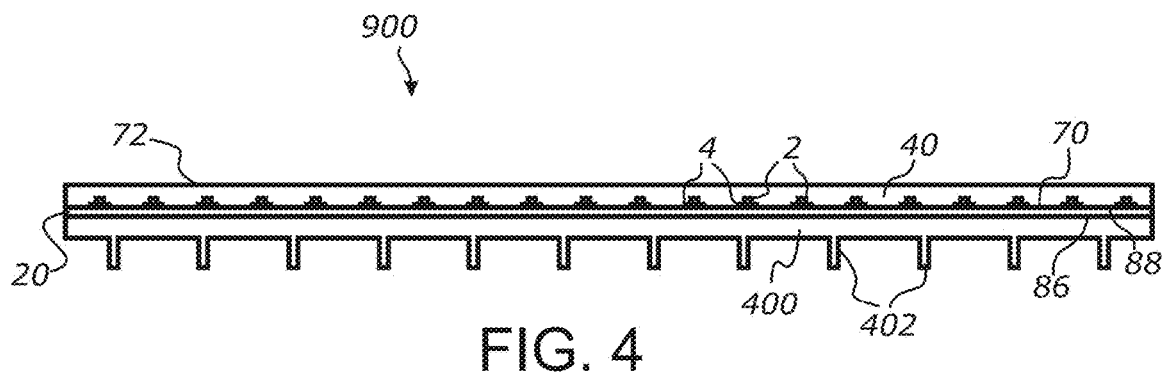
FIG. 4 is a schematic section view of a flexible LED illumination device laminated onto a broad-area heat sink having a planar configuration, according to at least one embodiment of the present invention.

FIG. 4 schematically shows an embodiment of flexible LED illumination device 900 which includes a broad-area heat sink 400. Heat sink 400 may be formed from a solid, rigid material that has good thermal conductivity. Conventionally, it may be formed from a metal, such as aluminum or copper. Heat sink 400 may include fins 402 that increase its surface area and promote heat dissipation. It is preferred that an effective surface area of heat sink 400 available for heat dissipation, including fins 402, is substantially greater than the area of the sheet-form structure of flexible LED illumination device 900 or any of its layers (e.g., flexible support substrate 20). According to some embodiments, the effective heat-dissipating area of heat sink 400 is greater than the area of flexible support substrate 20 by at least 1.3 times, at least 1.5 times, at least 1.75 times, and at least 2 times.

The layered laminate formed by flexible support substrate 20 and flexible encapsulation layer 40 is attached to heat sink 400 so that bottom surface 86 of support substrate 20 is disposed in a good mechanical and thermal contact with a planar broad-area surface of the heat sink. This can be done, for example, by means of conventional roll lamination in which flexible LED illumination device 900 is rolled onto the broad-area planar surface of heat sink 400 using a roll laminator. Alternatively, the sheet-form structure of flexible LED illumination device 900 may be applied to heat sink 400 using conventional vacuum lamination. A layer of heat resistant adhesive (e.g., silicone-based adhesive) may be provided between surface 86 and the respective broad-area surface of heat sink 400. Heat sink 400 may have sheet-form structure approximating in size the sheet-form structure of flexible LED illumination device 900.

Figure 5:
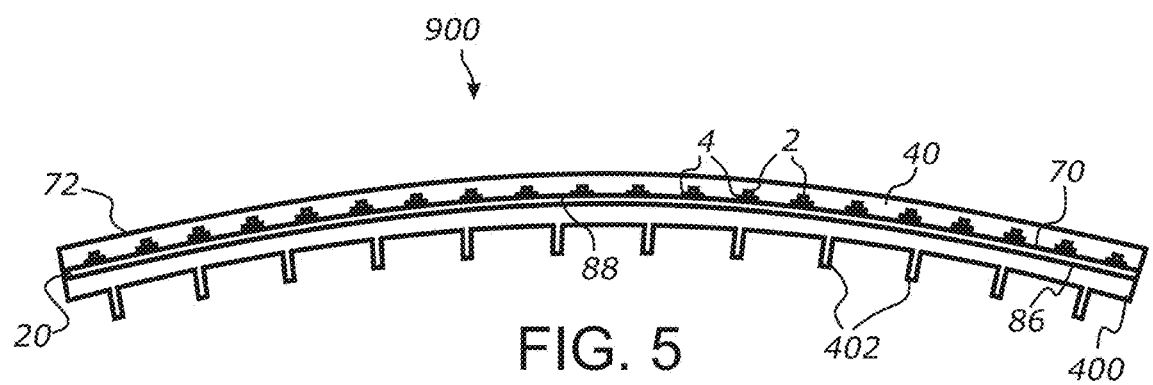
FIG. 5 is a schematic section view of a flexible LED illumination device laminated onto a broad-area heat sink having a curved configuration, according to at least one embodiment of the present invention.

FIG. 5 schematically shows an embodiment of flexible LED illumination device 900 which is similar to that of FIG. 4 except that heat sink 400 has a convex curved shape. It is noted that heat sink 400 may also have any other shapes, e.g., concave curved shape, a shape that is a combination of one or more concave and/or curved shapes, a corrugated shape, a three-dimensional shape obtainable by twisting a sheet-form, etc. According to one embodiment, heat sink 400 has a sheet-form structure and is also flexible.

In the above-described embodiments employing additional structures (e.g., heat sinks) that enhance heat dissipation from flexible LED illumination device 900, the maximum allowable areal power density characterizing the device may be increased. For example, flexible LED illumination device 900 may include a large two-dimensional array of LEDs 2 represented by micro-LED chips each drawing 0.001 W of electrical power. Such micro-LED chips may be distributed over the area of flexible LED illumination device 900 with an average areal density of 1000000 chips/m$^2$, yielding a PA of 1000 W/m$^2$. Yet, it may still be preferred that the power drawn by the device is limited to prevent excessive heat generation. According to different embodiments, it is preferred than $P_{LED\_MAX}$ is less than $4000/D_{LED}$, less than $2000/D_{LED}$, and less than $1000/D_{LED}$. According to different embodiments, $P_{LED\_MAX}$ is between 0.0001 W and 0.1 W, between 0.0005 W and 0.02 W, and between 0.001 W and 0.01 W.

LEDs 2 may be made digitally addressable as individual LEDs or as groups of such individual LEDs 2 so that their color and/or or brightness levels can be controlled by sending a predefined digital signal to such LEDs 2 or LED groups. For example, digitally addressable LEDs 2 may include a pulse width modulation (PWM) circuit and one or more digital input contacts. The PWM circuit may be built into each LED chip or package and may be controlled by shift-registers chained up down the electrical circuitry used to interconnect LEDs 2. LED illumination device 900 may include a programmable controller (not shown) including a PWM or DMA (direct memory access) control module configured to selectively operate individual LEDs 2 or predefined groups of LEDs 2.

It may be appreciated that surface 72 forms an optical interface between a higher-refractive-index material of encapsulation layer 40 and a lower-refractive-index outside medium (e.g., air). Accordingly, light rays propagating in encapsulation layer 40 at relatively high angles with respect to a normal to surface 72 may be trapped within such layer due to a total internal reflection (TIR) from the respective optical interface. In this regard, surface 88 may be advantageously made highly reflective to recycle light that is trapped within encapsulation layer 40.

Figure 6:
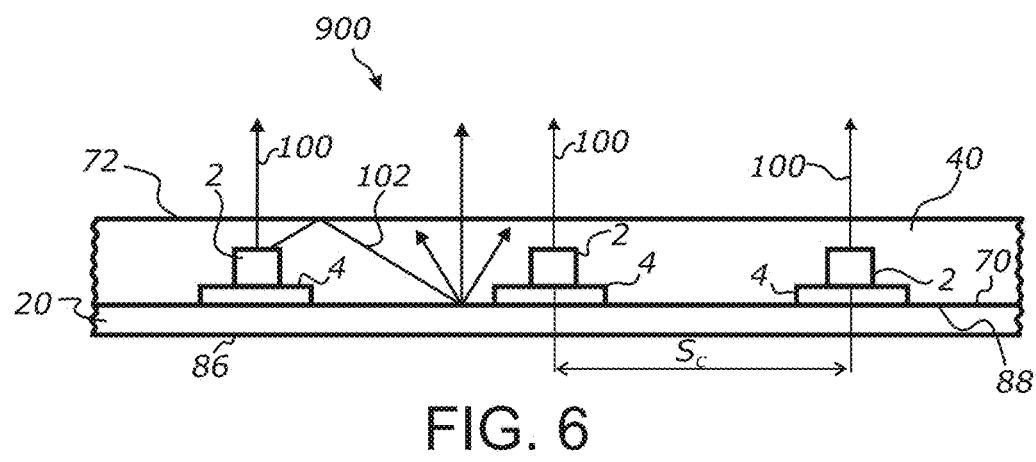
FIG. 6 is a schematic cross-section view and raytracing of a flexible LED illumination device portion, according to at least one embodiment of the present invention.

This is schematically illustrated in FIG. 6 showing a portion of flexible LED illumination device 900 and several light rays emitted by LEDs 2 distributed over surface 88 of flexible support substrate 20. Light rays 100 emitted by LEDs 2 towards a normal direction (with respect to surfaces 88 and 72) exit from flexible encapsulation layer 40 and further propagate outside of the encapsulation layer along such normal direction. In contrast, a high-angle off-axis ray 102 undergoes TIR at surface 72 and is reflected downwards to surface 88. Surface 88 having a high diffuse reflectance diffusely reflects ray 102 towards surface 72 so that the reflected rays have a second chance to escape from flexible encapsulation layer 40.

It may be appreciated that at least some of the light rays diffusely reflected from surface 88 may obtain sufficiently low angles with respect to a surface normal and exit from flexible encapsulation layer 40. At the same time, at least some of the diffusely reflected light rays may obtain relatively high propagation angles (above the critical angle of TIR) with respect to the same normal. Therefore, such extreme off-axis rays may be reflected from surface 72 again and the above-described light recycling process may repeat until most of the light emitted by the respective LED 2 is extracted from flexible LED illumination device 900.

Flexible LED illumination device 900 may be configured to emit light substantially from the entire area of flexible encapsulation layer 40 due to such light recycling. In order to facilitate light recycling, the optical transmittance and light scattering properties of flexible encapsulation layer 40 may be adjusted to allow for a generally unimpeded light propagation over a considerable distance horizontally through the layer in a waveguide mode and without extensive attenuation/absorption before being emitted from surface 72. Thus, according to an aspect of the present invention, flexible encapsulation layer 40 may be configured as a flexible waveguide (light guide) that can guide light both longitudinally and laterally in response to optical transmission and TIR. In order to enhance the waveguiding properties of flexible encapsulation layer 40, surface 70 may be coated with a specularly reflective material. Alternatively, surface 88 may be coated with a specularly reflective material.

According to one embodiment, each portion of surface 88 is illuminated by two or more LEDs 2. In other words, areas of surface 88 illuminated by two or more adjacent LEDs may be at least partially overlapping.

The light guiding and/or light-recycling operation of flexible encapsulation layer 40 may cause at least some light emitted by a particular LED 2 to reach the area of one or more adjacent LEDs 2. In other words, in at least some implementations of flexible LED illumination device 900, two or more LEDs 2 may be disposed in optical communication with one another so that one LED 2 may receive at least some light emitted by another LED 2. According to some implementations, each LED 2 is configured to receive at least a portion of light emitted by one, two or more adjacent LEDs 2. According to one embodiment, a group of at least 9 LEDs 2 located on a flexible portion of support substrate 20 are disposed in optical communication with each other. According to one embodiment, a group of at least 16 LEDs 2 located on a flexible portion of support substrate 20 are disposed in optical communication with each other.

Such groups of LEDs 2 disposed in optical communication with each other may also include a relatively large number of LEDs 2, e.g., 25 LEDs 2 or more, 36 LEDs 2 or more, and even 100 LEDs 2 or more. Although in such cases some of the light emitted by one LED 2 may be absorbed by the adjacent LED 2, the respective light loss may be minimized by appropriately spacing and sizing LEDs 2. According to one embodiment, the size of LEDs 2 or at least its light absorbing portion is much less than a spacing distance Sc between adjacent LEDs 2. According to one embodiment, a size of each LEDs 2 is less than 0.3 the spacing distance Sc, more preferably less than 0.2 the spacing distance Sc, and may be as less than 0.1 the spacing distance Sc.

Rigid substrates 4 may have sizes greater than the sizes of respective LEDs 2 in which case the areas of such substrates 4 that are not covered by LEDs 2 may also be exposed to light propagating longitudinally and/or laterally within flexible encapsulation layer 40. The open areas of each individual rigid substrate 4 may be disposed in energy receiving relationship with respect to LEDs 2 mounted to one, two, three, four or more adjacent substrates 4. In order to minimize light losses, the exposed surfaces of each rigid substrate 4 may be coated with a high-reflectance coating, such as diffuse titanium dioxide white-powder coating, for example. Furthermore, the dimensions of each rigid substrate 4 may be selected so as to minimize interaction with light propagating in flexible encapsulation layer 40. The size of rigid substrates 4 may be selected to be substantially smaller than a distance between adjacent substrates 4 and LEDs 2.

Portions of surface 88 exposed to light emitted by LEDs 2 may occupy a predominant portion of the area of flexible support substrate 20 on the light emitting side while LEDs 2 may occupy a relatively small area of the substrate on that side. According to various embodiments, the cumulative area of LEDs 2 (or at least the light-emitting apertures of LEDs 2) is less than 20%, less than 10%, less than 5%, and less than 2% of a total area of surface 88.

It may be appreciated that providing relatively large spacing between LEDs 2 may create an uneven apparent brightness of flexible LED illumination device 900. More specifically, flexible LED illumination device 900 may have areas of elevated brightness (corresponding to LEDs 2) and relatively dark areas of reduced brightness (corresponding to spaces between LEDs 2). Considering that the surface brightness of conventional LEDs may reach several million $cd/m^2$ and that a typical range of average brightness of wide-area illumination devices is 50-10,000 $cd/m^2$, the apparent brightness variation across the light-emitting surface of flexible LED illumination device 900 may be substantial.

According to one embodiment, flexible encapsulation layer 40 may be configured to have relatively strong light diffusing properties while surface 88 may be configured for a high reflectance of at least 85% and more preferably at least 90%. In such a case, direct light rays emitted by LEDs 2 and indirect (recycled) light rays reflected by surface 88 may randomly mix and superimpose on one another resulting in a relatively uniform brightness of flexible LED illumination device 900. Furthermore, spacing Sc between LEDs 2 may be adjusted to allow for some overlapping of the light beams emitted by adjacent LEDs 2. According to various embodiments, flexible LED illumination deice 900 is configured such that a relative difference between bright and dark areas is less than 10 times, less than 5 times, less than 2 times, less than 1.5 times, and less than 1.2 times, when measured by averaging the brightness over a small sampling area. The small sampling area may be selected as a square or round area that has dimensions at least three times greater than the size of individual LEDs 2 and at least two times less than an average distance between adjacent LEDs 2.

Flexible LED illumination device 900 may ordinarily be configured in the form of a thin, rectangular sheet having a layered structure including a back sheet formed by flexible support substrate 20 and a front sheet (or top sheet) formed by flexible encapsulation layer 40 with surface 72 being a light emitting surface of the device. LEDs 2 distributed over the area of the rectangular sheet may be interconnected in series, in parallel or a combination thereof.

Figure 7:
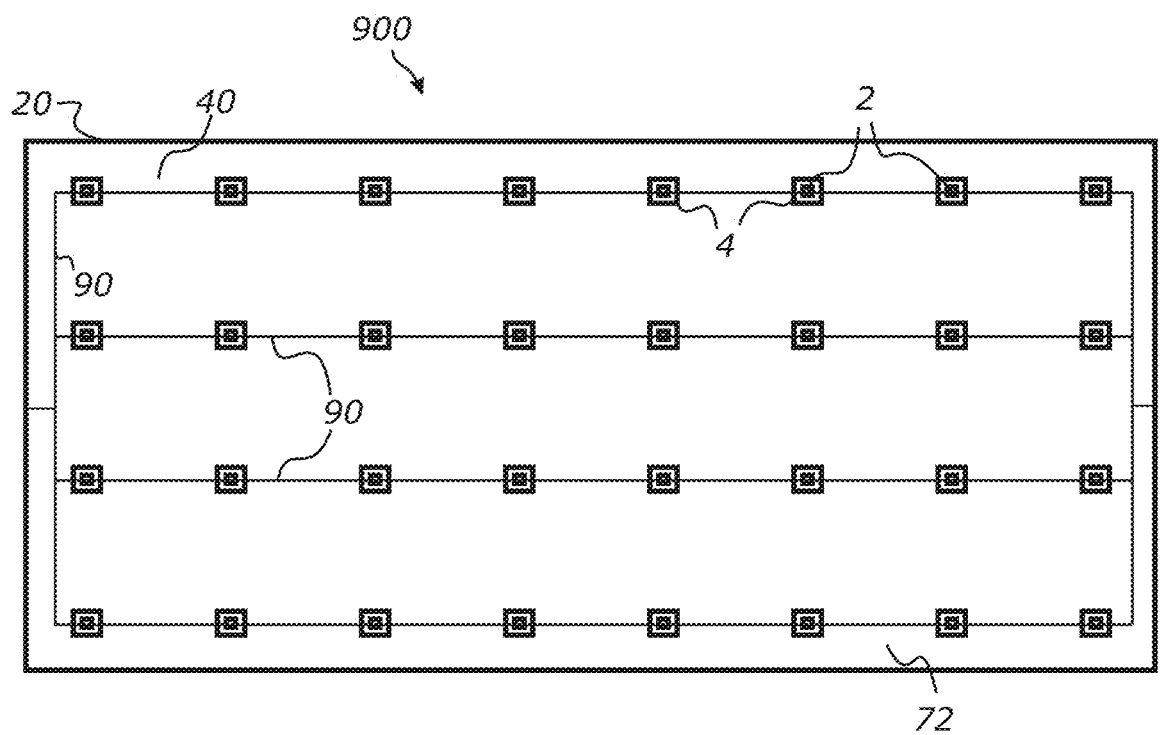
FIG. 7 is a schematic view of a flexible LED illumination device having a rectangular panel configuration and multiple LEDs arranged in rows and columns, according to at least one embodiment of the present invention.

FIG. 7 schematically shows flexible LED illumination device 900 having a rectangular configuration and an ordered two-dimensional array of LEDs 2 arranged in rows and columns. Each row in the LED array is formed by LEDs 2 connected in series using flexible electrical connections 90. The rows of LEDs 2 are further interconnected in parallel using additional flexible electrical connections 90.

Figure 8:
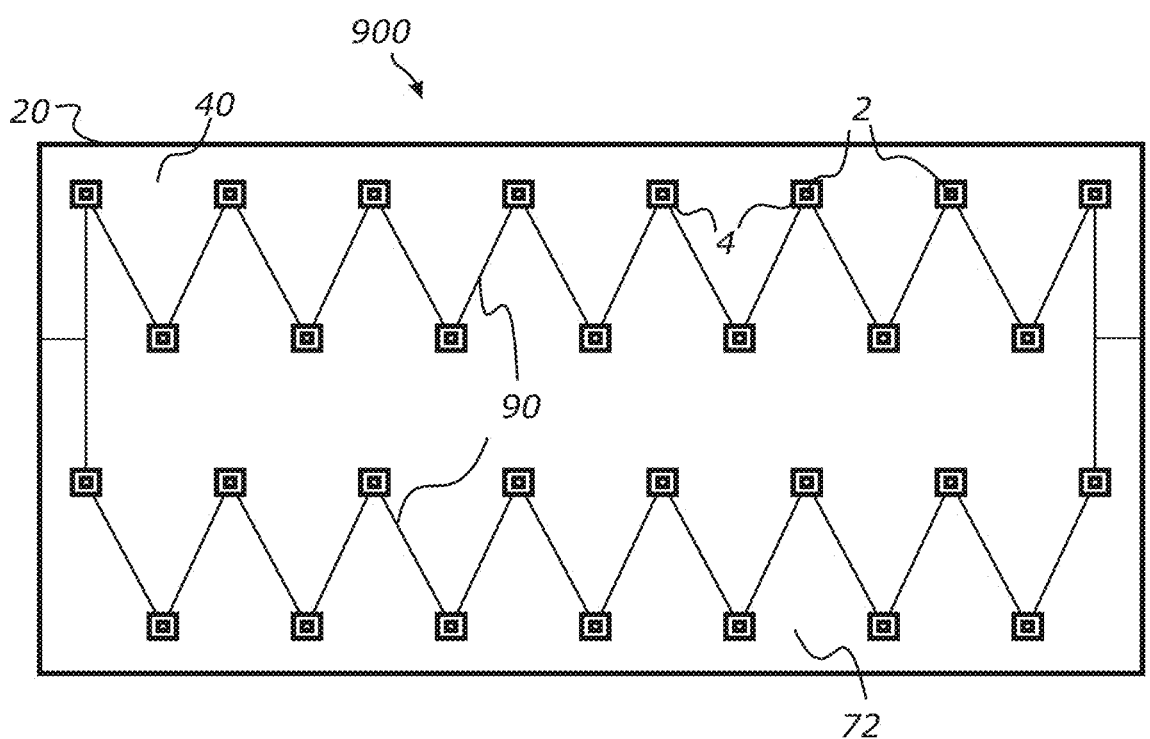
FIG. 8 is a schematic view of a flexible LED illumination device having a rectangular panel configuration and multiple LEDs having an alternative arrangement, according to at least one embodiment of the present invention.

FIG. 8 schematically illustrates an alternative arrangement of LEDs 2 in a two dimensional array in which LEDs 2 are disposed in staggered rows and/or columns. FIG. 8 further schematically illustrates an alternative arrangement of flexible electrical connections 90. It should be understood that the patterns of LEDs 2 and electrical connections 20 are not limited to those shown in FIG. 7 and FIG. 8 and may include any other suitable two-dimensional patterns, including those having random, quasi-random, or quasi-ordered distributions of LEDs 2. LEDs 2 may also be interconnected using other combinations of serial and/or parallel connections 90. Flexible LED illumination device 900 may also have LEDs 2 arranged into and interconnected within two-dimensional sections, groups or clusters. Such two-dimensional sections, groups or clusters of interconnected LEDs 2 may be interconnected between each other or individually connected to a power supply.

Flexible electrical connections 90 may be exemplified by electrical wires, contacts, leads or traces used for electrically connecting LEDs 2 to a power supply or an external circuit and having sufficiently low thickness allowing such electrical connections 90 to flex, bend or fold together with the sheet-form structure of flexible LED illumination device 900. Flexible electrical connections 90 may ordinarily be made from a high-electrical-conductivity metallic material, such as copper, and may take various suitable forms, e.g., round wire, flat wire, mesh wire, strips of an electroconductive film or foil, surface-printed electrical conduits, and the like. Such flexible electrical connections 90 may be bonded directly to flexible support substrate 20 (e.g., to surface 88) and form an integral part of such substrate. Flexible electrical connections 90 may also be embedded into flexible encapsulation layer 40 and at least partially suspended in flexible encapsulation layer 40. According to one embodiment, flexible electrical connections 90 may be formed from a transparent material such as a transparent conductive oxide (TCO) film or surface coating deposited onto surface 88.

Flexible LED illumination device 900 may also have non-rectangular shapes and configurations, including simple or complex shapes that may be created using flexible sheet-form structures. In one embodiment, LED illumination device 900 has a form of a rectangular strip in which a length dimension is much greater than a width dimension. In some embodiments, LED illumination device 900 has a round shape, a quasi-round shape, an oval shape, a rectangular shape with rounded corners, or a generally rectangular shape.

According to one embodiment, flexible support substrate 20 and flexible encapsulation layer 40 are implemented in the form of continuous broad-area sheets that have identical shapes and sizes. The sheet-form structure of flexible LED illumination device 900 formed by such flexible support substrate 20 and flexible encapsulation layer 40 laminated on one another may thus have terminal ends or edges defined by and coinciding with the respective terminal ends or edges of flexible support substrate 20 and flexible encapsulation layer 40. According to an aspect of the embodiment, such flexible LED illumination device 900 may be configured as a relatively thin, large-area, continuous light-emitting sheet broadly extending both longitudinally and laterally (along a length and width dimensions). Such light-emitting sheet may be cut to a suitable shape by making the cuts in spaces between LEDs 2 embedded into flexible encapsulation layer 40.

In some applications, edges of flexible LED illumination device 900 may be additionally protected, for example, by a moisture impermeable tape, coating, trim or an extrusion channel. One or more edges of flexible LED illumination device 900 may also be provided with a rigid or semi-rigid stiffener, such as a bar or extrusion channel attached to the respective edge(s). According to different embodiments, such stiffeners may be provided at one edge, two edges, three edges or four edges of flexible LED illumination device 900.

According to one embodiment, flexible encapsulation layer 40 may have dimensions that are slightly less than the dimensions of flexible support substrate 20, thus proving bleed areas along the perimeter of flexible LED illumination device 900 that are free from the material of flexible encapsulation layer 40. Such bleed areas of flexible support substrate 20 that are free from the material of encapsulation layer 40 may be used for different purposes. For example, such bleed areas may include electrical contacts for connecting flexible LED illumination device 900 to a source of electrical power. The bleed areas may also be used for positioning various features used for attaching flexible LED illumination device 900 to other surfaces or structures. The bleed areas may be overmolded with other materials, for example for protecting the edges of the device and/or electrical terminals used to connect flexible LED illumination device 900 to a power supply. The sheet-form structure of flexible LED illumination device 900 may include holes punched at corners of the respective light emitting sheet and configured for attaching or mounting it to other structures. Such corners may be reinforced with additional material to improve tear resistance of the light emitting sheet.

Figure 9:
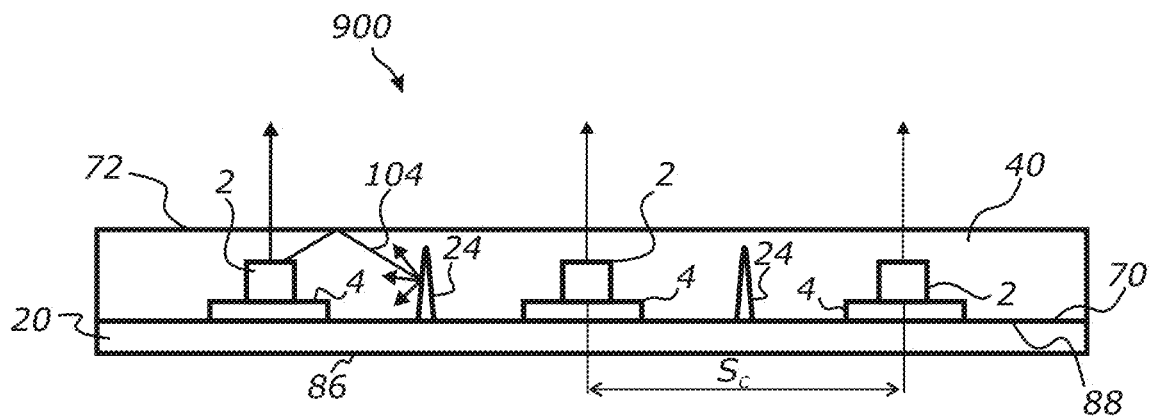
FIG. 9 is a schematic section view of a flexible LED illumination device portion including separation walls within an optically transmissive encapsulation layer, according to at least one embodiment of the present invention.

FIG. 9 schematically illustrates an embodiment of flexible LED illumination device 900 which includes a plurality of separation walls 24 formed between LEDs 2 within encapsulation layer 40. Each wall 24 protrudes from flexible support substrate 20 perpendicularly to the surface and extends through a portion of the thickness of encapsulation layer 40 so that it at least partially optically isolating adjacent LEDs 2 from each other. According to an aspect of the embodiment illustrated in FIG. 9, opaque separation walls 24 surrounding LEDs 2 create light recycling cells around each LED 2. Such configuration of flexible LED illumination device 900 may be advantageously selected for applications requiring at least partial optical isolation of LEDs 2 from each other.

According to some embodiments, the material of reflective separation walls 24 is reflective and should preferably have a diffuse reflectance of at least 75%, more preferably at least 80%, and even more preferably 85% or more. Such reflective separation walls 24 may be configured to confine light within the designated "pixel" area by reflecting and scattering light rays back to the respective light recycling cell, as illustrated by a light ray 104.

According to one embodiment, separation walls 24 are configured to primarily absorb light rather than reflect light. Light absorbing separation walls 24 may be advantageously selected for applications requiring a relatively sharp cutoff of light intensity at the boundaries of "pixels" formed by respective LEDs 2. According to one embodiment, reflective or absorptive separation walls 24 may be formed around clusters of LEDs 2 (e.g., optically separating clusters of LEDs 2 having the same color or the same digital address in a digitally addressable LED array).

Separation walls 24 may be formed, for example, by molding, overmolding, screen-printing, 3D printing or digitally printing the respective structures on top of surface 88 using a light- and heat-resistant thermoplastic resin. For example, the material for separation walls 24 may include a high-reflectance polyphthalamide (PPA) resin or a similar material. It is preferred that a height of separation walls 24 above surface 88 is less than a nominal thickness of flexible encapsulation layer 40 so that such walls are fully encapsulated within the layer together with LEDs 2. According to an alternative embodiment, the height of separation walls 24 may be approximately equal or greater than the nominal thickness of flexible encapsulation layer 40 so that walls 24 may be conformably coated by the encapsulation material or even have tips protruding from surface 72 and exposed to the environment.

According to one embodiment, separation walls 24 are formed by an optically transmissive material which further includes a colored pigment configured to absorb light at some wavelengths and transmit light at different wavelengths. According to one embodiment, separation walls 24 are formed by an optically transmissive material which further includes a luminescent material configured to absorb light at one wavelength and re-emit at least a portion of such light at a second, different wavelength. According to one embodiment, separation walls 24 are formed by an optically transmissive material which further includes light scattering particles. The material of separation walls 24 may also include both light scattering particles and luminescent materials or colored pigments in any suitable combination.

Figure 10:
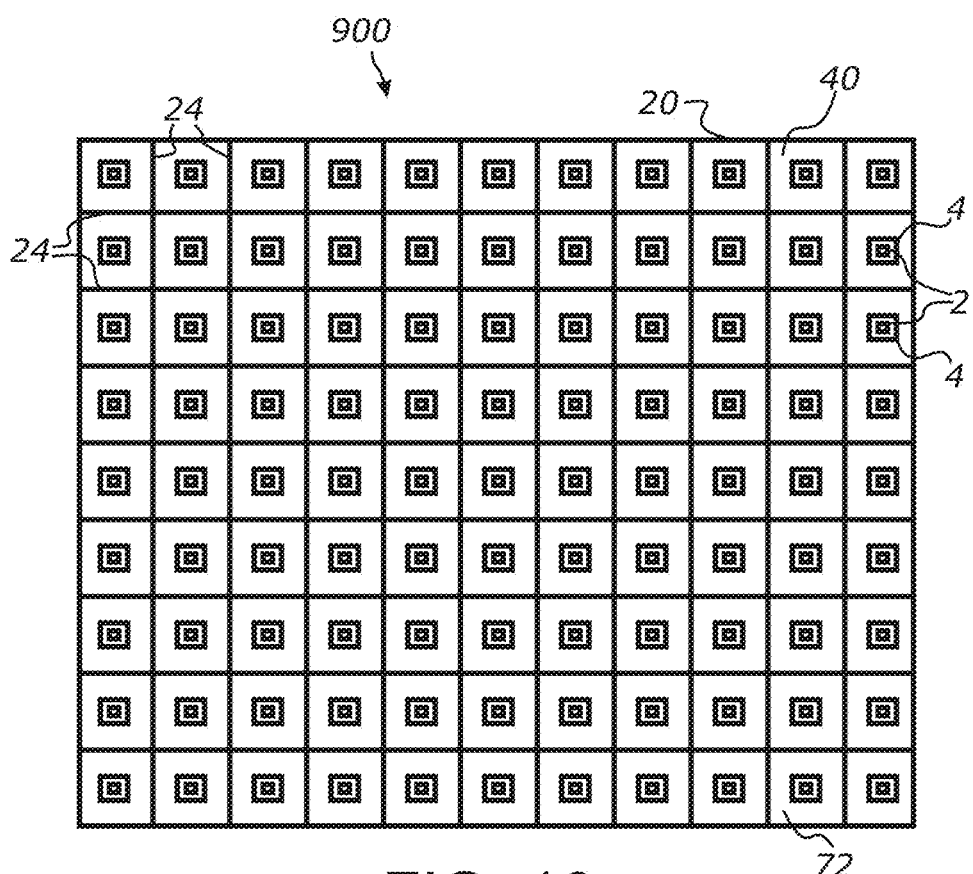
FIG. 10 is a schematic top view of a flexible LED illumination device portion including a grid of separation walls disposed between light emitting diodes, according to at least one embodiment of the present invention.

FIG. 10 shows a schematic top view of flexible LED illumination device 900 including a grid of intersecting separation walls 24 formed between LEDs 2 that are arranged into an ordered two-dimensional array. It is noted that separation walls 24 are not limited to straight shapes arranged into a rectangular grid. According to alternative implementations, separation walls 24 may have curved or segmented profiles and may be configured to form optically isolated light recycling cells that have, for example, triangular, hexagonal, octagonal, round, or elongated shapes or outlines.

Figure 11:
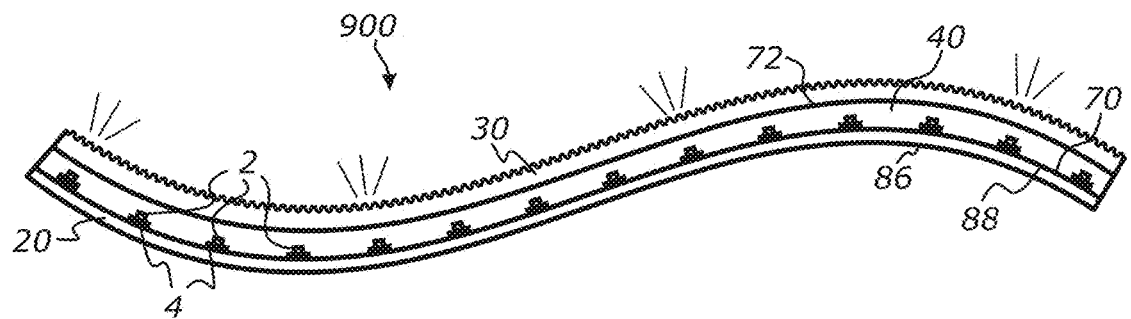
FIG. 11 is a schematic section view of a flexible LED illumination device including a top light diffusing sheet, according to at least one embodiment of the present invention.

FIG. 11 schematically shows, in a cross-section, an embodiment of flexible LED illumination device 900 which further includes a flexible light diffusing sheet 30 laminated to surface 72 of flexible encapsulation layer 40. Light diffusing sheet 30 may be formed from a film-thickness rigid material (e.g., polycarbonate) that provides sufficient flexibility for the multi-layer light emitting sheet formed by flexible LED illumination device 900. Alternatively, Light diffusing sheet 30 may be formed from an elastomeric, soft and flexible material that may be somewhat similar in mechanical properties to the material of flexible encapsulation layer 40 (e.g., silicone).

Light diffusing sheet 30 includes surface microstructures to further diffuse light emitted by LEDs 2 and emerging from flexible encapsulation layer 40. Such surface microstructures may be formed according to an ordered or random pattern. According to one embodiment, the surface microstructures include microlenses. According to one embodiment, at least some of the microlenses may have larger dimensions than the dimensions of LEDs 2 and such microlenses may be disposed in registration with individual LEDs 2 to provide at least some light collimation towards a surface normal direction.

Flexible LED illumination device 900 may be bent to any suitable shape. It may also be applied to planar or curved surfaces of other objects, for example, by means of lamination. A layer of adhesive may be provided on the back side of flexible support substrate 20 to facilitate attaching the device to various planar or curved surfaces. The flexibility of various layers of sheet-form LED illumination device 900 should be sufficient to allow the device to conform to other shapes and/or surfaces.

Figure 12:
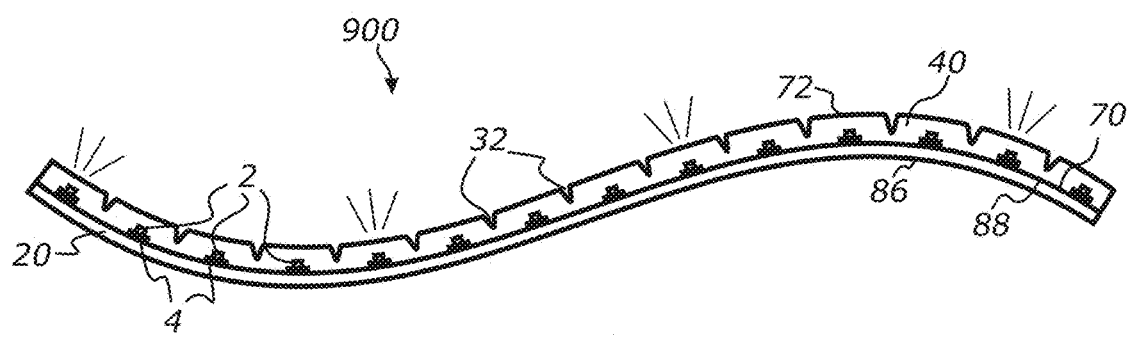
FIG. 12 is a schematic section view of a flexible LED illumination device including a plurality of grooves formed in a flexible encapsulation layer, according to at least one embodiment of the present invention.

Flexible encapsulation layer 40 may also be patterned to enhance the flexibility of LED illumination device 900 and further reduce the minimum radius of curvature of bends. FIG. 12 schematically shows an embodiment of flexible LED illumination device 900 in which flexible encapsulation layer 40 includes a plurality of parallel grooves 32 formed in surface 72. Such grooves may have a triangular or trapezoidal cross-section with a sufficient width at their bases to accommodate or at least partially absorb stresses occurring in encapsulation layer 40 during tight bends.

Figure 13:
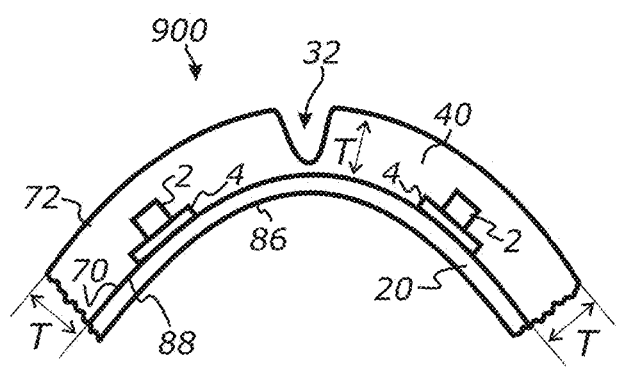
FIG. 13 is a schematic section view of a flexible LED illumination device portion in a flexed state, showing a groove at least partially accommodating a deformation of a flexible encapsulation layer, according to at least one embodiment of the present invention.
Figure 14:
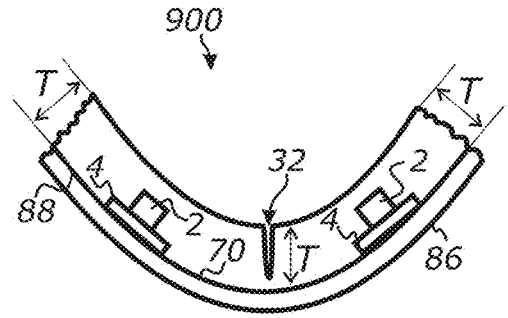
FIG. 14 is a schematic section view of a flexible LED illumination device portion in an alternative flexed state, showing a groove at least partially accommodating a deformation of a flexible encapsulation layer, according to at least one embodiment of the present invention.

This is illustrated in FIG. 13 and FIG. 14 schematically showing portions of flexible LED illumination device 900 including one V-shaped groove 32. As it can be seen, such groove 32 may changes its shape, especially a width at its base, to accommodate the changing geometry of flexible LED illumination device 900. As it is further illustrated, absorbing at least some of the flexural deformation by grooves 32 may allow for maintaining nominal thickness T at areas of the tight bends. Grooved implementations of encapsulation layer 40 may also be advantageously selected for foldable configurations of flexible LED illumination device 900. Flexible LED illumination device 900 may be configured to be foldable with the locations of the folds coinciding with the locations of one or more grooves 32. Grooves 32 may also be configured to have other shapes. For example, each groove 32 may have a rectangular shape with vertical or near-vertical walls. In another example, each groove 32 may have a tapered rectangular shape with sloped walls.

According to one embodiment, flexible encapsulation layer 40 may be provided with areas of reduced thickness to facilitate bending or folding. Such thickness may be the highest in the areas of LEDs 2 and gradually decreasing to a predefined minimum value in one or more spacing areas separating LEDs 2. Alternatively, or in addition to providing grooves 32 or areas of reduced thickness, any one or both flexible encapsulation layer 40 and flexible support substrate 20 may be perforated at select areas to facilitate folding. For example, flexible encapsulation layer 40 and/or flexible support substrate 20 may be perforated along a straight line so that flexible LED illumination device 900 will tend to fold at such perforated line. The entire flexible LED illumination device 900 may be perforated, including all its layers.

Flexible support substrate 20 may be configured for enhanced passive heat dissipation without using heat sinks. For example, according to one embodiment, flexible support substrate 20 may include corrugations, bumps, or indentations that increase the effective surface area. It may be preferred that such corrugations, bumps or indentations are formed in spaces between LEDs 2. Flexible support substrate 20 may also include ribs formed on the other side with respect to LEDs 2. Any suitable part of flexible support substrate 20 may have such ribs. The entire flexible support substrate 20 may be ribbed. According to one embodiment, LED illumination device 900 further included a corrugated heat-spreading layer attached to support substrate 20 with a good thermal contact.

Flexible LED illumination device 900 may be configured such that it can be wrapped around objects, such as, for example, objects having a tubular form. Flexible LED illumination device 900 may also be operatively connected to such objects, for example, to form a retractable sheet-form illumination device.

Figure 15:
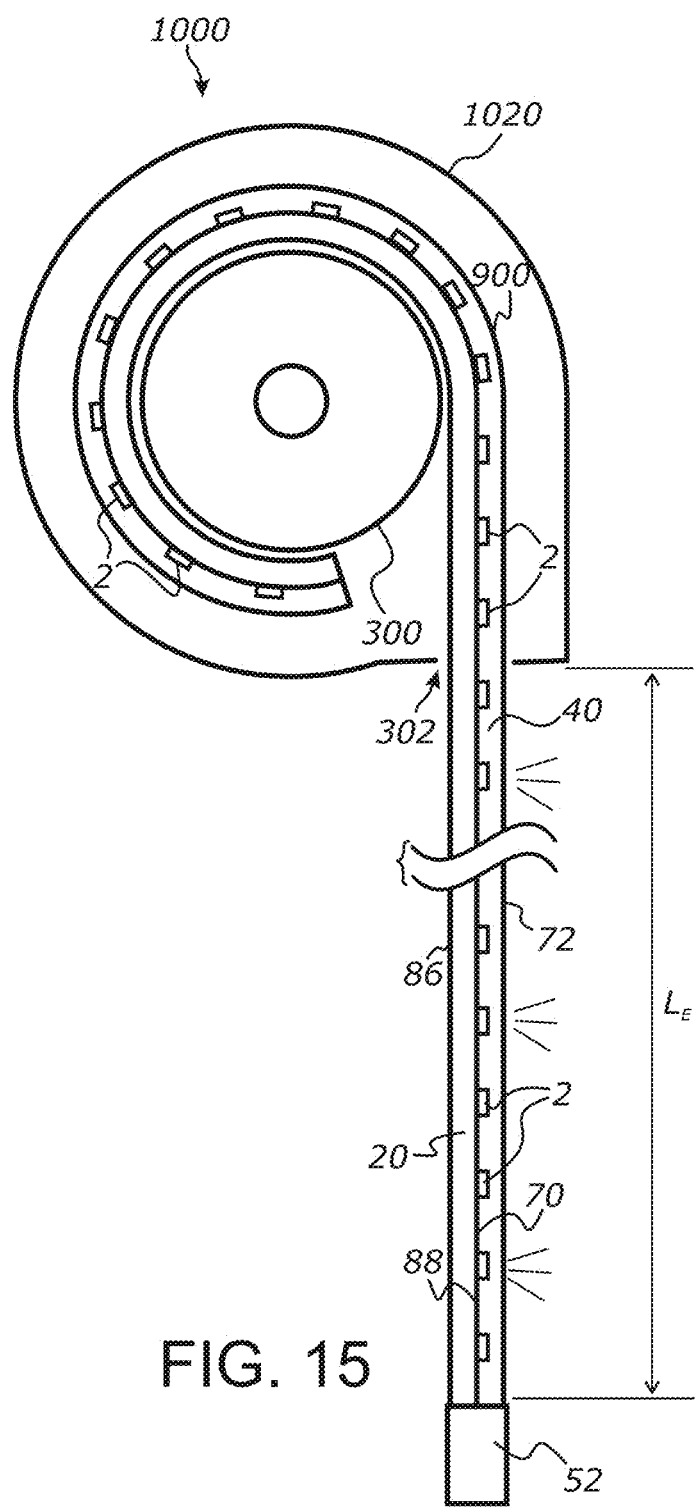
FIG. 15 is a schematic view of a retractable LED illumination panel employing a flexible LED illumination device, according to at least one embodiment of the present invention.

FIG. 15 schematically illustrates a retractable sheet-form LED illumination panel 1000 employing a light-emitting sheet formed by flexible LED illumination device 900 windingly receivable around a cylindrical roller 300. Retractable sheet-form LED illumination panel 1000 includes a cylindrical housing 1020 encasing roller 300 and a portion of flexible LED illumination device 900 that is windingly received around the roller. Cylindrical housing 1020 includes an extended narrow opening configured to accommodate flexible LED illumination device 900. Such opening is exemplified by a slit 302 that has a width that is greater than a thickness of flexible LED illumination device 900. During normal operation, sheet-form LED illumination panel 1000 or its portion may be contained within cylindrical housing 1020. In a fully extended position, all or most of the broad area of flexible LED illumination device 900 may be exposed. Retractable sheet-form LED illumination panel 1000 may also be configured to allow for partially retracted/extended positions of flexible LED illumination device 900.

LED illumination panel 1000 further includes a bar 52 attached to a bottom edge of flexible LED illumination device 900. Such bar 52 may be used as a weight helping keep the exposed/extended portion of flexible LED illumination device 900 in a vertical orientation and a straight shape. Bar 52 may also be used as a handle for manual opening/retracting of flexible LED illumination device 900.

Roller 300 may be made operable manually or using a motor. Some implementations of retractable sheet-form LED illumination panel 1000 may be configured to include components (e.g., roller, housing, weight bar, clutch mechanism, mounting hardware) similar to those employed in retractable window shades (e.g., roller shades). Retractable sheet-form LED illumination panel 1000 may also be configured to have an appearance or overall design similar to those of certain retractable window shades. Some implementations of retractable sheet-form LED illumination panel 1000 may be configured to include components and have an overall appearance and/or design of a retractable screen used for projecting images.

Cylindrical housing 1020 may have any other suitable configuration that differs from that illustrated in FIG. 15. Roller 300 may be replaced with a different component, e.g., mandrel, etc., which has a similar function of windingly receiving the light emitting sheet formed by flexible LED illumination device 900.

LEDs 2 may be made digitally addressable individually or by horizontal rows. Such digitally addressable LEDs 2 or rows of LEDs 2 may be selectively turned on and off depending on whether such LEDs 2 or rows of LEDs 2 are exposed or hidden from view within housing 1020. Retractable LED illumination panel 1000 may include a controller 1050 (not shown) that is configured to selectively energize or dim LEDs 2 in response to extending or retracting the device, respectively. For example, in a partially extended/retracted position of the light emitting sheet formed by flexible LED illumination device 900, horizontal rows of exposed LEDs 2 that are located on the extended portion of the sheet may be turned on while keeping or turning the rest of LEDs 2 off. The dynamic energizing or de-energizing of respective rows of LEDs 2 may be synchronized with the mechanism that extends/retracts flexible LED illumination device 900 from/into housing 1020 so that the area of a light emitting surface is proportional or approximately equal to the retracted area of the device. The actuation and synchronous energizing/de-energizing of LEDs 2 may be done automatically, semi-automatically or manually.

According to one embodiment, controller 1050 is configured to dynamically turn LEDs 2 (or rows of LEDs 2) on and off in response to a user pressing a remote switch electrically connected to retractable LED illumination panel 1000. In operation, when retractable LED illumination panel 1000 is in a fully retracted position, a user may press the switch causing the panel to extend at a relatively slow pace. In different implementations, an electric motor actuating roller 300 is configured such that panel 1000 extends from a fully retracted position to a fully extended position in at least 5 seconds, at least 10 seconds, at least 15 seconds, and at least 20 seconds. The switch may be configured such that panel 1000 keeps extending until the switch is released or until it is fully extended. Alternatively, the switch may be configured such that retractable LED illumination panel 1000 keeps extending until the switch is pressed again or until the panel is fully extended. The user may stop retractable LED illumination panel 1000 in a partially extended position by releasing the switch or pressing it a second time, respectively. Similarly, controller 1050 may be configured so that panel 1000 can be retracted fully or partially by operating the remote switch in the same sequence as for extending the panel. Retractable LED illumination panel 1000 may be configured so that it can be turned on and off in extended or partially extended position. In this case, controller 1050 may be provided with a memory unit that stores information about the panel position. Alternatively, retractable LED illumination panel 1000 may be provided with sensors configured to detect the retracted/extended position of the panel and communicate such information to controller 1050.

According to one embodiment, controller 1050 is configured to dynamically turn LEDs 2 (or rows of LEDs 2) on and off in response to a varying length $L_E$ of the exposed portion of flexible LED illumination device 900 such that only the extended/exposed portion of the device is illuminated. According to an aspect, the illuminated area of flexible LED illumination device 900 can be made proportional to length $L_E$. Length $L_E$ may be encoded using any suitable means, for example, using a known-type rotary or linear position encoder operably engaged upon roller 300 or the sheet-form structure of flexible LED illumination device 900. In one embodiment, length $L_E$ may be encoded using a rotary stepper motor engaged upon roller 300 and electrically connected to controller 1050. Retractable LED illumination panel 1000 may include a control system utilizing one or more optical sensors and configured to selectively energize and de-energize LEDs 2 in response to detecting the rotary position of roller 300 or retracted/extended position of flexible LED illumination device 900.

LEDs 2 may be distributed over the area of flexible LED illumination device 900 with a relatively high density so that retractable LED illumination panel 1000 can appear to have a substantially uniform brightness for a distant observer. Furthermore, flexible encapsulation layer 40 may be formed by a continuous optically transmissive, light diffusing sheet configured to mask the bright areas produced by individual LEDs 2 and further enhance the brightness uniformity across the light emitting surface. Embodiments employing uniform-brightness LED illumination device 900 may be advantageously selected to reduce the blinding effect of individual LEDs 2 and a distraction of building occupants in response to frequent extending or retracting the device (especially when it is done in an automated mode).

The overall light output and brightness of LED illumination panel 1000 may be made a function of the extended length $L_E$ by dimming LEDs 2. In one embodiment, the total luminous output of retractable LED illumination panel 1000 may be selected by a user. For example, the user may set the desired level of light output from the panel (e.g., 1,000 lumens, 2,000 lumens, etc.). In response to the user-selected desired light output, the brightness of the panel may be increased/decreased by the controller with the decrease/increase of length $L_E$, respectively so that the total light output from the panel remains about the same selected value for a range of retracted/extended positions of the panel.

According to one embodiment, light controls associated with retractable LED illumination panel 1000 may be configured to provide a constant visual brightness of the exposed light emitting area of retractable LED illumination panel 1000, regardless of the length $L_E$. According to some embodiments, the visual brightness of retractable LED illumination panel 1000 may be made progressively increasing or decreasing with the increase of length $L_E$.

Retractable LED illumination panel 1000 may be mounted to a ceiling to form a lighting luminaire with a significantly reduced footprint and visibility when it is in a fully or partially retracted state. It can be operated from a fully closed (retracted) position to a fully open (extended) position and illuminated in response to the changing demand for lighting.

An embodiment of retractable LED illumination panel 1000 may also configured as a light-emitting window shade or covering. Such light-emitting window shade or covering may be incorporated into a window of a building façade. In an extended position, it may be used to block direct sunlight (thus reducing glare and excessive heat intake) and provide privacy. In addition, such light-emitting window shade may provide soft light for building interior both during the daytime and at night when the ambient sunlight is not available. The light-emitting window shade employing retractable LED illumination panel 1000 may be associated with daylight controls that automatically extend, retract and/or energize the panel to provide a desired interior illumination level and/or visibility through the window.

According to one embodiment, LED illumination panel 1000 may be configured to have the same basic arrangement as shown in FIG. 15 but with flexible LED illumination device 900 replaced with a flexible organic light emitting diode (OLED) panel. Such flexible OLED panel may include digitally addressable organic LEDs that can be selectively energized in response to detecting length $L_E$ of the extended portion of the panel as described above. In a further alternative, flexible LED illumination device 900 of the embodiment of FIG. 15 may be replaced with a flexible mesh having an area-distributed two-dimensional array of inorganic LEDs attached to the mesh.

Figure 16:
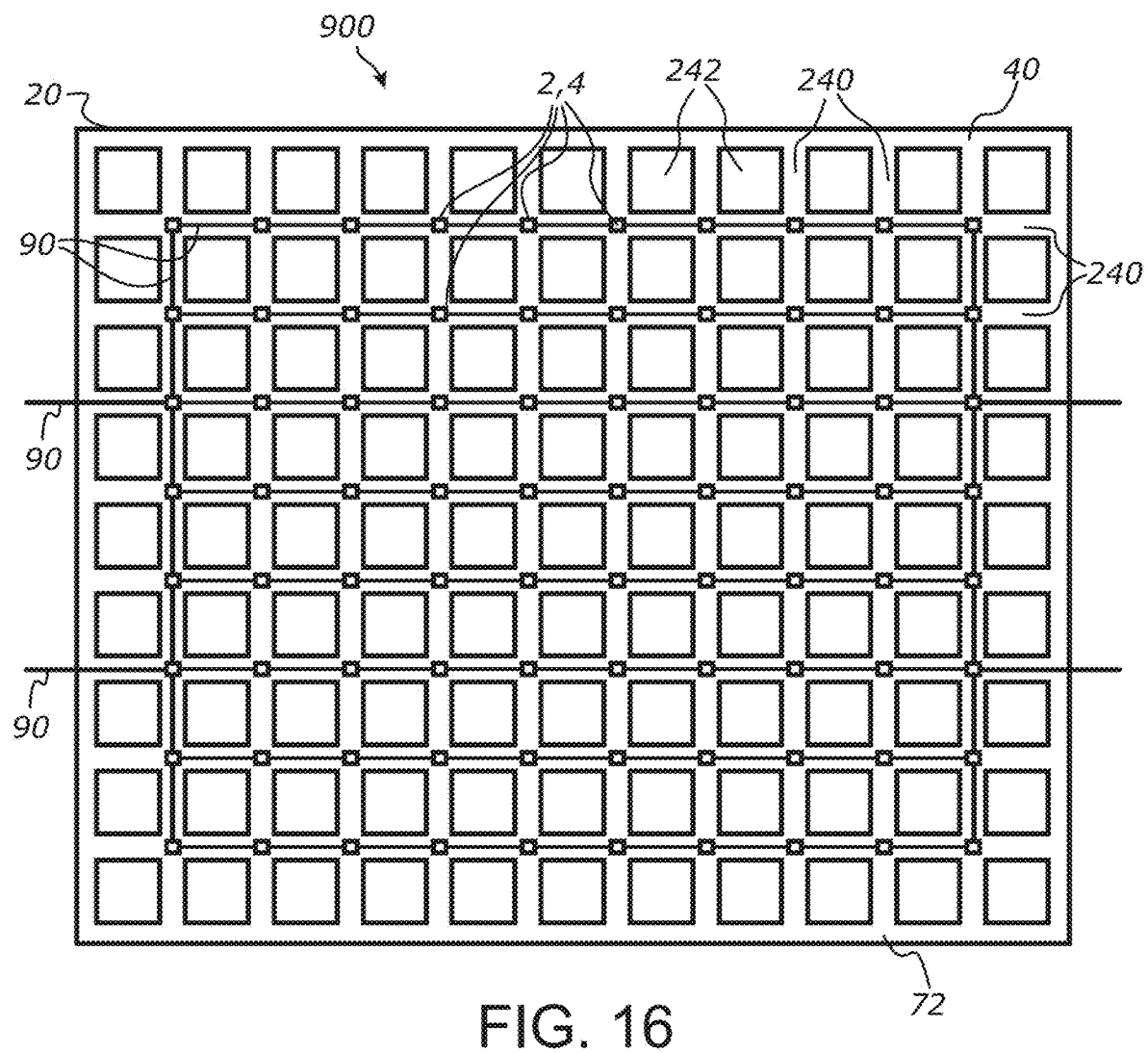
FIG. 16 is a schematic top view of a flexible LED illumination device having a support substrate configured in the form of a heat-spreading mesh, according to at least one embodiment of the present invention.

FIG. 16 schematically shows an embodiment of flexible LED illumination device 900 in which flexible support substrate 20 is configured as a heat-conducting mesh formed by a grid of flexible connecting members 240 and openings 242 between such flexible connecting members 240. Flexible connecting members 240 form grid connection nodes at their intersection points. The assemblies of LEDs 2 and respective rigid substrates 4 are mounted to flexible support substrate 2s0 at such grid connection nodes. Flexible electrical connections 90 interconnecting LEDs 2 with each other within series-connected groups and connecting such series-connected groups in parallel to a power supply (not shown) are bonded to selected flexible connecting members 240.

Referring further to FIG. 16, according to one embodiment, flexible encapsulation layer 40 may be configured in the form a continuous sheet encapsulating LEDs 2 and rigid support substrates 4 and optionally encapsulating the grid of flexible connecting members 240. Alternatively, flexible encapsulation layer 40 may be formed by depositing a layer of optically transmissive encapsulation material to a top surface of flexible connecting members 240 to encapsulate just LEDs 2 with respective rigid substrates 4 while leaving openings 242 free from such material. In a yet further alternative, flexible encapsulation layer 40 may be applied just to the areas of grid connection nodes to which LEDs 2 are attached. Uncovered openings 242 may be used for natural air circulation or for providing a partial view through flexible LED illumination device 900.

Figure 17:
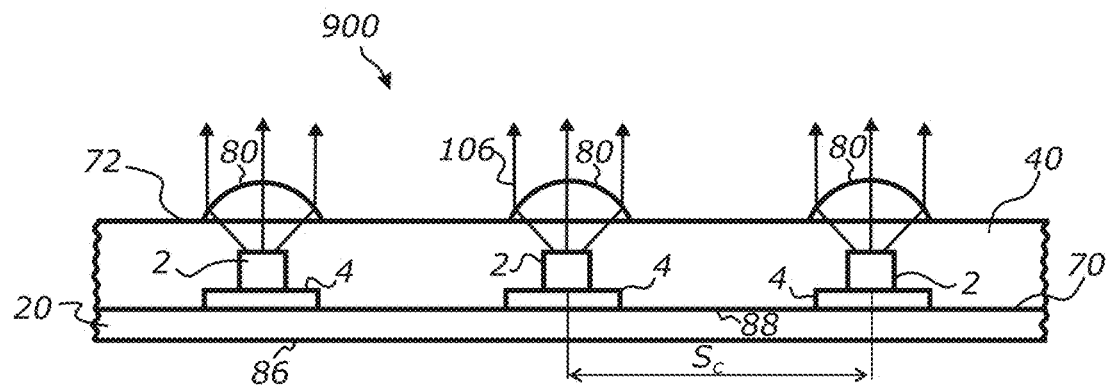
FIG. 17 is a schematic view of a flexible LED illumination device portion including collimating optical elements disposed in registration with light emitting diodes, according to at least one embodiment of the present invention.

According to one embodiment, LED illumination device 900 includes a plurality of beam-shaping optical elements distributed over light emitting surface 72 and disposed in registration with respective LEDs 2. This is illustrated in FIG. 17 which schematically showing a portion of flexible LED illumination device 900 including collimating lenses 80 attached to surface 72 and disposed in registration with and optically coupled to individual LEDs 2. Each lens 80 is configured to receive at least a substantial portion of divergent light emitted by individual LED 2 and collimate such light towards a normal direction. This is illustrated by the respective light ray paths in FIG. 17 (e.g., by the path of a light ray 106). In order to maximize the light collimating operation of the device, lenses 80 may be disposed at their respective focal distances from the light emitting areas of LEDs 2. According to one embodiment, a single optical element (e.g., lens 80) may be associated with a compact group of LEDs 2. According to one embodiment, lenses 80 may be formed in a separate layer of an optically transmissive material (which may also be flexible) which can be laminated on top of flexible encapsulation layer 40 or disposed at a distance from the layer.

Figure 18:
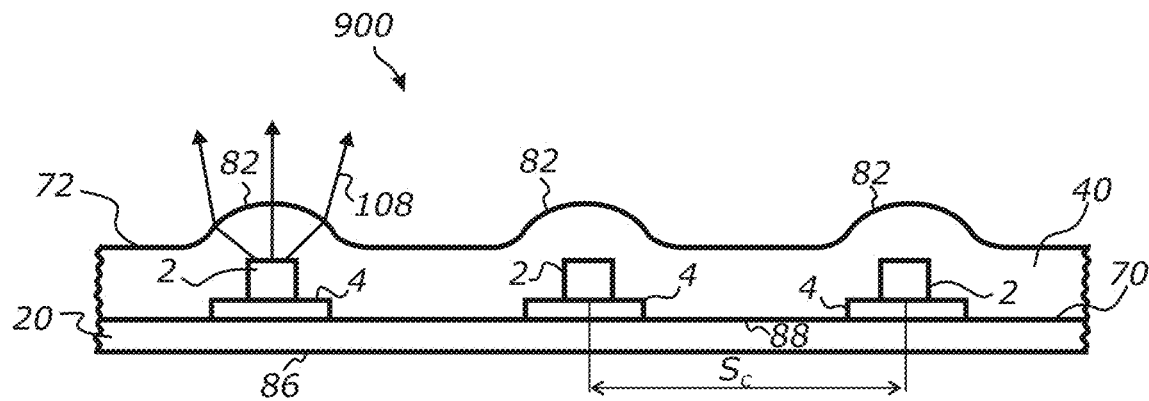
FIG. 18 is a schematic view of a flexible LED illumination device portion including beam-shaping surface relief structures disposed in registration with light emitting diodes, according to at least one embodiment of the present invention.

Beam-shaping optical elements, such as lenses 80 or the like, may be formed directly in flexible encapsulation layer 40. For example, such optical elements may be formed as surface relief features in surface 72, e.g., by means of molding or conformal coating. Referring to FIG. 18, flexible encapsulation layer 40 includes lens-shaped surface structures 82. Such surface structures 82 may be formed, for example, by applying flexible encapsulation layer 40 to surface 88 in the form of a high-viscosity conformal coating with the subsequent solidification or curing to a solid form. Such conformal coating may be configured to form lens-shaped bumps above the respective LEDs 2 as a result of the coating process and the relatively high-viscosity of the coating material. Such lens-shaped bumps may be allowed to retain their shape during the subsequent solidification or curing process, resulting in lens-like surface structures 82. Portions of top surface 72 between lens-like surface structures 82 may be ordinarily allowed to be planar and parallel to bottom surface 70

As further illustrated in FIG. 18, surface structures 82 may be configured to provide at least some form of collimation (e.g., as schematically illustrated by the path of a light ray 108) and/or suppressing TIR at surface 72.

Figure 19:
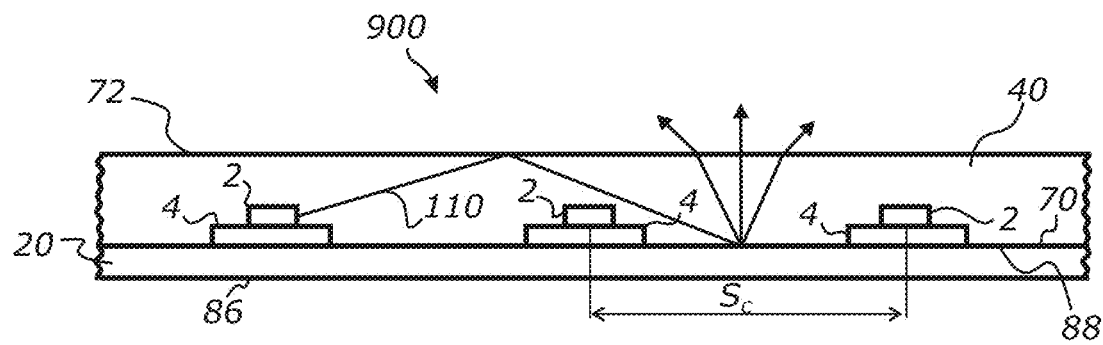
FIG. 19 is a schematic view of a flexible LED illumination device portion including side-emitting LEDs, according to at least one embodiment of the present invention.

FIG. 19 schematically illustrates an embodiment of flexible LED illumination device 900 in which LEDs 2 are side-emitting LEDs. Each side-emitting LED 2 is configured to emit light from sides of the respective LED die such that most of the emitted light becomes trapped within flexible encapsulation layer 40 by means of TIR. This is illustrated by example of a light ray 110 that is emitted at a relatively low angle with respect to a prevailing plane of flexible encapsulation layer 40. Upon striking surface 72, ray 110 forms an incidence angle that is greater than the TIR angle characterizing such surface. Accordingly, ray 100 is reflected from surface 72 by means of TIR and is further guided by flexible encapsulation layer 40 in a waveguide mode until it strikes surface 70 and is diffusely reflected towards light output surface 72.

According to one embodiment, LED illumination device 900 is configured to emit light indirectly. In order to achieves such mode of operation, side-emitting LEDs 2 may be configured to emit light only from the sides of the respective LED die so that most of the emitted light rays have to be reflected from surface 88 to be emitted from LED illumination device 900. According to one embodiment, LED illumination device 900 is configured to emit light both directly and indirectly. This can be done using side-emitting LEDs 2 configured to also emit light from the top surface so that light emitted by the device 900 may include both direct and indirect components.

Figure 20:
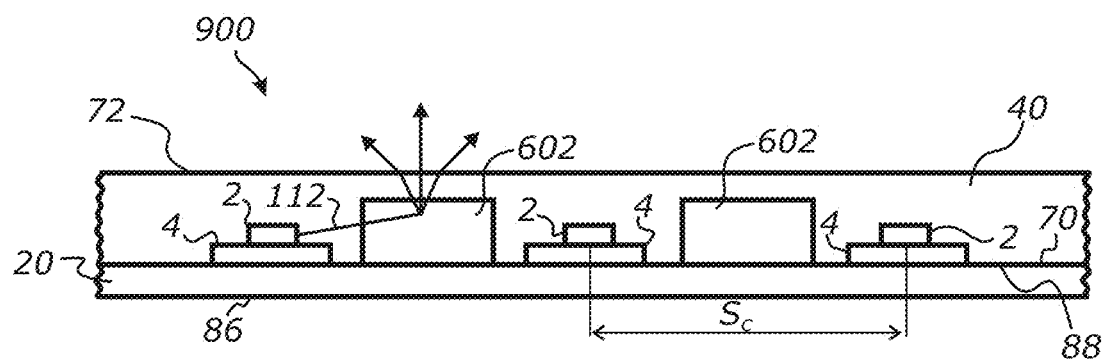
FIG. 20 is a schematic view of a flexible LED illumination device portion including side-emitting LEDs and light extracting mesa structures, according to at least one embodiment of the present invention.

FIG. 20 schematically illustrates an embodiment of flexible LED illumination device 900 similar to that of FIG. 19, except that it further includes light extracting mesa structures 602 in spaces between side-emitting LEDs 2. Light extracting mesa structures 602 are attached to surface 88 of flexible support substrate 20 and are encapsulated by flexible encapsulation layer 40 and embedded into the material of flexible encapsulation layer 40 along with LEDs 2.

Each light extracting mesa structure 602 is formed by a rectangular block of a light transmitting material which further includes light scattering particles. The light scattering particles are uniformly distributed throughout the volume of the mesa structure with a predefined density such that a light ray 112 emitted from a side of side-emitting LED 2 and striking light extracting mesa structure 602 is scattered towards light output surface 72 and out of flexible LED illumination device 900.

According to one embodiment, light extracting mesa structures 602 also include luminescent (wavelength-converting) material configured to absorb light at least at one wavelength and re-emit a portion of the absorbed light at a different wavelength. The material of light extracting mesa structures 602 may also include one or more colored pigments for filtering the spectrum of light emitted by LEDs 2.

According to some embodiments, side-emitting LEDs 2 may be replaced with other types of compact solid state lighting devices, such as laser diodes. For example, LEDs 2 of the embodiment of FIG. 20 may be replaced with side-emitting laser diodes that emit light within a narrow angular cone in a plane that is parallel or near-parallel to the prevailing plane of flexible encapsulation layer 40.

Figure 21:
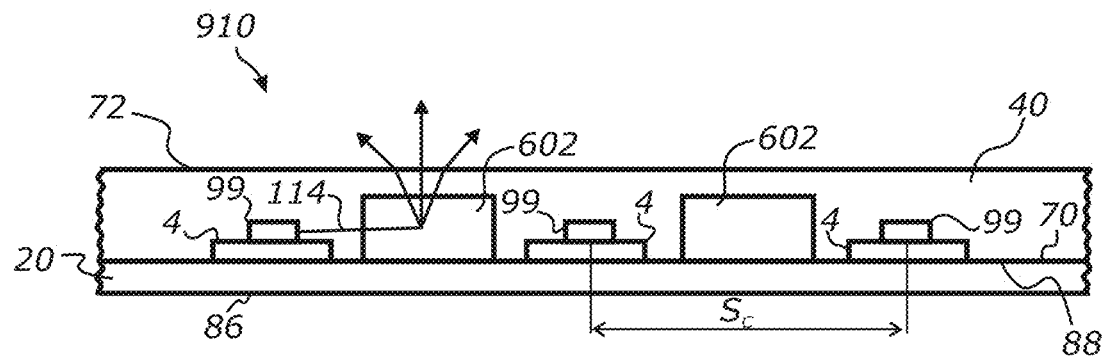
FIG. 21 is a schematic view of a flexible LED illumination device portion including side-emitting laser diodes and light extracting mesa structures, according to at least one embodiment of the present invention.

This is illustrated in FIG. 21 schematically showing a flexible solid-state illumination device 910 having the same basic configuration of flexible LED illumination device 900 but employing side-emitting laser diodes 99 in place of LEDs 2. In operation, each side-emitting laser diode 99 emits light along a direction that is parallel to surfaces 70 and 72, which is schematically illustrated by a light ray 114. The emitted light is intercepted by light extracting mesa structures 602 and extracted out of flexible encapsulation layer 40 with at least some scattering and wavelength conversion.

Light extracting mesa structures 602 are not limited to rectangular block shapes and may be implemented in any other shapes. According to one embodiment, light extracting mesa structures 602 may have a dome-shaped configuration with a round or rectangular base. According to one embodiment, each light extracting mesa structure may be shaped in the form of a well surrounding individual LED 2 or laser diode 99. According to one embodiment, light extracting mesa structures are connected with each other to form a two-dimensional grid. LEDs 2 or laser diodes 99 may be positioned in the openings formed by such grid.

According to an aspect of the present invention, at least some embodiments presented herein (e.g., embodiments employing side-emitting LEDs 2 of laser diodes 99) may represent configurations of flexible LED illumination device 900 that emit at least a portion of light indirectly (e.g., when light rays first trike light-scattering surface 88 or light extracting mesa structures 602). Such or similar embodiments of flexible LED illumination device 900 may also be configured to substantially preclude or at least minimize the direct view of excessively bright light sources (such as LEDs or laser diodes 99). For example, the emission angle of side-emitting LEDs 2 or laser diodes 99 may be so selected to result in substantially all light rays to become trapped in a waveguide mode within flexible encapsulation layer 40 due to TIR at surface 72.

Figure 22:
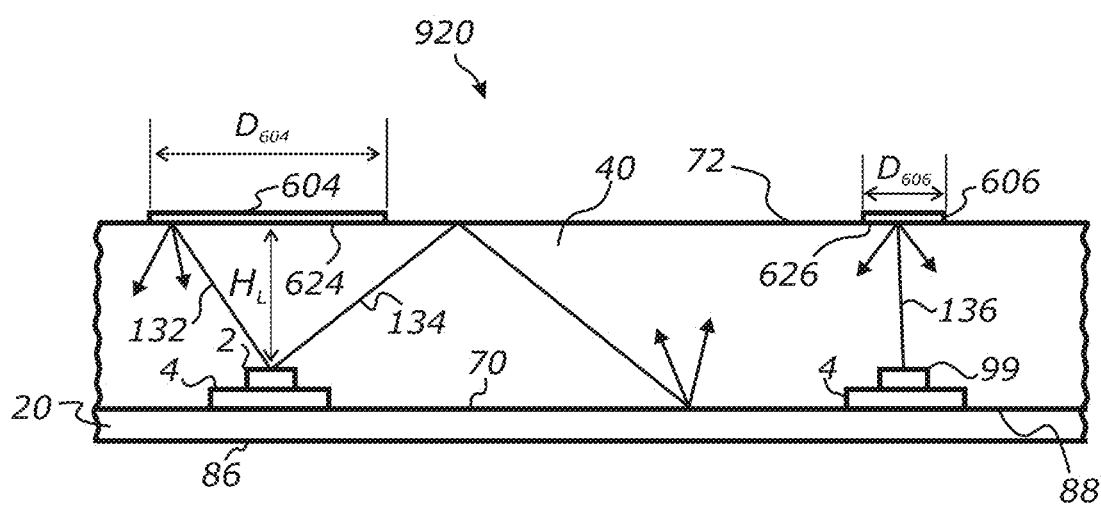
FIG. 22 is a schematic view of a flexible LED illumination device portion including top-emitting LEDs and light extracting mesa structures, according to at least one embodiment of the present invention.

It is noted, however, that flexible LED illumination device 900 may also be configured for indirect illumination using top-emitting solid-state sources. This is schematically illustrated in FIG. 22 showing a flexible solid-state illumination device 920. Flexible solid state illumination device 920 has a basic structure that is similar to those of LED illumination device 900 and flexible solid state illumination device 920 except that it employs a mix of top-emitting LEDs 2 and laser diodes 99 and further includes opaque beam control elements 604 and 606 attached to surface 72.

Each of beam control elements 604 and 606 may be exemplified by a thin disk of an opaque material that has a reflective bottom surface (surfaces 624 and 626, respectively) that is facing flexible encapsulation layer 40.

Beam control elements 604 and 606 are dimensioned to intercept at least substantial portions of the light beams emanated by the respective solid state sources (LED 2 and laser diode 99) and reflect such light beams back to diffusely reflective surface 88 so that the reflected beams can be recycled and emitted from flexible solid state illumination device 920 in an indirect fashion.

Beam control element 604 is particularly dimensioned to intercept the direct light rays that strike surface 72 at incidence angles (with respect to a normal to surface 72) being greater than the TIR angle characterizing surface 72. According to different embodiments, beam control element is formed by a thin disk of an opaque, diffusely reflective material having a diameter $D_{604}$ that is at least two times, at least four times, at least six times, and at least ten times larger than the size of respective LED 2. According to one embodiment, diameter $D_{604}$ is defined from the following relationship: $D_{604}=2H_L \tan \theta_C$, where $H_L$ is a distance between the light emitting aperture of LED 2 and surface 72, and $\theta_C$ is a critical angle of a total internal reflection (TIR) characterizing the optical interface formed by the material of flexible encapsulation layer 40 and the outside medium. When the outside medium is air, $\theta_C$ can be found from the following relationship: $\sin \theta_C = 1/n$, where n is a refractive index of the material of flexible encapsulation layer 40.

According to one embodiment, $D_{604} \leq 2H_L \tan \theta_C$. According to one embodiment, $D_{604}=2H_L$. According to one embodiment, $D_{604} \leq 2H_L$. According to one embodiment, the diameter of light control element 604 is twice the thickness of flexible encapsulation layer 40. According to one embodiment, the diameter of light control element 604 is greater than one half of the thickness of flexible encapsulation layer 40 and less than the thickness of flexible encapsulation layer 40.

A diameter $D_{606}$ of beam control element 606 disposed above laser diode 99 can be made considerable smaller than that of control element 604 since a laser source may be configured to emit a very narrow beam of light (e.g., 1-2° or so). Yet, diameter $D_{606}$ should be considerably larger than the light emitting aperture of laser diode 99. According to one embodiment, diameter $D_{606}$ is at least two times larger than a size of the light emitting aperture of laser diode 99, and more preferably more than 4 times larger.

According to some embodiments, light control elements 604 and/or 606 are coated with a luminescent material on surfaces 624 and/or 626, respectively. According to one embodiment, light control elements 604 and/or 606 are formed by a semi-opaque sheet material. According to one embodiment, light control elements 604 and/or 606 are formed by a perforated sheet material.

A method of making flexible LED illumination device 900 may include several steps that can be performed in various orders. A first step may include providing a sufficiently thin and thermally conductive sheet of a rigid material (e.g., aluminum/copper foil, flexible PCB, etc.) and forming flexible support substrate 20 from such thermally conductive sheet. The first step may include adding one or more layers or other materials which can have different functions (e.g., electric insulation or conductance, optical reflectance, surface protection, etc.).

A second step may include providing a plurality of LEDs 2, which may be in a form of unpackaged LED chips or dies, and further providing a plurality of rigid substrates 4. A third step may include bonding LEDs 2 to rigid substrates 4. Each rigid substrate may accept one, two, three or more unpackaged LED chips or dies.

A fourth step may include mounting the assemblies of LEDs 2 on rigid substrates 4 to flexible support substrate 20 at select locations so that a two-dimensional array of LEDs 2 distributed over surface 88 is formed. This may be done, for example, by means of positioning the assemblies of LEDs 2 and rigid substrates 4 on surface 88 using an automated pick-and-place machine with the subsequent soldering, welding or bonding the assemblies to the surface at the prescribed locations. In an alternative, rigid substrates 4 may be first welded, bonded or soldered to flexible support substrate 20 and LEDs 2 may be attached/bonded to the respective rigid substrates 4 afterwards. In a further alternative, rigid substrates 4 and/or LEDs 2 may be printed on flexible support substrate 20 using a 3D printing technique.

A fifth step may include forming and/or applying flexible encapsulation layer 40 over the array of LEDs 2. In one embodiment, flexible encapsulation layer 40 may be deposited over the array of LEDs 2 in a liquid form with subsequent curing to a solid form. In one embodiment, flexible encapsulation layer 40 may be provided in a form of an appropriately-sized semi-cured flexible sheet that can be applied on top of flexible support substrate so as to cover and hermetically encapsulate the entire array of LEDs 2. A bottom surface of such semi-cured sheet may be made highly soft and tacky to allow conforming to the shape of mesa structures formed by LEDs 2 (including rigid substrates 4) on otherwise flat surface 88. The semi-cured sheet may also be configured to conformably coat any other micro-components associated with LEDs 2 or LED illumination device 900, such as electronic components, electrical traces, contacts, etc. The application of the semi-cured sheet may be assisted by applying pressure to the sheet over its entire area (e.g., using atmospheric pressure in a vacuum-lamination system). The semi-cured sheet may be allowed to generally maintain its thickness and thus form bumps or lens-like structures above LEDs 2 (such as structures 82 discussed above).

The semi-cured sheet may be subsequently cured to form a monolithic, flexible sheet-form structure of LED illumination device 900 with embedded LEDs 2. When flexible LED illumination device 900 is configured to include a broad-area heat sink (see, e.g., FIG. 4 and FIG. 5), a further step may include laminating the flexible sheet-form structure of the device to such heat sink.

Various configurations of flexible LED illumination device 900 may be directed to different applications and end-use products. According to one embodiment, flexible LED illumination device 900 may be configured as a backlight and incorporated into a rigid or flexible LCD display. According to one embodiment, flexible LED illumination device 900 may be configured as a backlight and incorporated into an advertising display including a translucent image print. According to one embodiment, flexible LED illumination device 900 may be configured as a flexible lighting luminaire which can be used in a suspended position as a stand-alone lighting fixture or incorporated as a component into a more complex lighting system. Any of such products may also be implemented in a retractable (roll-up) configuration employing basic structure and principle described in reference to FIG. 15.

In some implementations, flexible LED illumination device 900 or any of its portion may be overmolded by another material. In one embodiment, flexible LED illumination device 900 is overmolded with a soft and elastic material (e.g., rubber-like silicone) which may completely cover surfaces 72, 86 and the edges of the device. The overmolding material may have any suitable color, including but not limited to white, black, yellow, red, blue, green, and may have different grades of gray color. The overmolding material may also be made translucent or transparent and may further be configured to encapsulate all of the exposed surfaces of flexible LED illumination device 900 (including its light emitting surface 72).

In some implementations, flexible LED illumination device 900 may be inserted into a rectangular sheet-form sleeve formed by two rectangular sheets of a polymeric material bonded to each other along two or three edges of the respective rectangular shape. Such sheet-form sleeve may have dimensions that are slightly larger than sheet-form flexible LED illumination device 900 so as to easily accommodate such device. At least one of the sides of the sheet should be made transparent or translucent and configured to transmit light emitted by flexible LED illumination device 900. The sheet-form sleeve may be configured to at least partially protect flexible LED illumination device 900 from the environment.

Further details of a structure and different modes of operation of flexible LED illumination devices shown in the drawing figures as well as their possible variations and uses will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. An electronic display device, comprising:
   a layered monolithic sheet-form structure having a generally rectangular shape with rounded corners, a thickness of less than 1.5 mm, and a smooth outer surface, the layered monolithic sheet-form structure comprising:
      a first layer formed by a flexible sheet of an optically transparent material having a substantially uniform thickness and a Young's modulus of at least 1 GPa;
      a second layer formed by a flexible sheet of an optically transparent or translucent material having a substantially uniform thickness, the second layer being approximately coextensive in size with the first layer;
      a third layer being approximately coextensive in size with the first and second layers and comprising one or more sheets of an opaque heat-conductive material;
      a light emitting region having a generally rectangular area and comprising a plurality of solid-state light emitting devices arranged in a two-dimensional pixel array, the two-dimensional pixel array having a longer dimension from 10 centimeters to 30 centimeters and a pixel density of at least 300 pixels per inch, wherein the two-dimensional pixel array comprises at least one million individually digitally addressable organic light emitting diodes (OLEDs) and has an area that is greater than 90% of a total area of the first layer;
      a first adhesive layer disposed on a front side of the two-dimensional pixel array;
      a second adhesive layer disposed on a back side of the two-dimensional pixel array;
      a first fold area longitudinally extending along a major dimension of the layered monolithic sheet-form structure; and
      at least one transparent area,
   wherein the layered monolithic sheet-form structure hermetically encapsulates the two-dimensional pixel array,
   wherein each of the OLEDs has a size from 1 micrometer to 300 micrometers,
   wherein each individual pixel in the two-dimensional pixel array comprises at least one OLED configured to emit light in red color, at least one OLED configured to emit light in green color, and at least one OLED configured to emit light in blue color, and
   wherein the layered monolithic sheet-form structure is configured for repetitive and reversible folding upon itself with a radius of curvature from 1 mm to 5 mm in the first fold area.

2. An electronic display device as recited in claim 1, wherein the light emitting region is configured to emit light with a luminous emittance of 2500 $lm/m^2$ or more.

3. An electronic display device as recited in claim 1, wherein the layered monolithic sheet-form structure comprises a grid of electrical contacts formed by a transparent conductive oxide.

4. An electronic display device as recited in claim 1, wherein the two-dimensional pixel array is configured to emit light with luminous emittance values in a range having an upper bound of at least 2500 $lm/m^2$.

5. An electronic display device as recited in claim 1, wherein the two-dimensional pixel array is configured to emit light with luminous emittance values in a range having an upper bound from 3000 $lm/m^2$ to 150000 $lm/m^2$.

6. An electronic display device as recited in claim 1, further comprising a rectangular grid of optically opaque separation walls extending perpendicular to a plane of the layered monolithic sheet-form structure and defining a two-dimensional regular array of light control cells separating adjacent OLEDs from one another, each of the light control cells having a generally rectangular shape.

7. An electronic display device as recited in claim 1, further comprising a rectangular grid of optically opaque separation walls extending perpendicular to a plane of the layered monolithic sheet-form structure, wherein the optically opaque separation walls have a tapered shape in a cross-section.

8. An electronic display device as recited in claim 1, further comprising a rectangular grid of optically opaque separation walls extending perpendicular to a plane of the layered monolithic sheet-form structure, wherein the optically opaque separation walls have one or more curved surface.

9. An electronic display device as recited in claim 1, wherein the optically transparent material of the first layer has a hardness of at least 6H on the Mohs scale.

10. An electronic display device as recited in claim 1, wherein the layered monolithic sheet-form structure has a thickness of less than 1 mm.

11. An electronic display device as recited in claim 1, wherein the layered monolithic sheet-form structure has a thickness of less than 0.75 mm.

12. An electronic display device as recited in claim 1, wherein the layered monolithic sheet-form structure has a thickness of less than 0.5 mm.

13. An electronic display device as recited in claim 1, wherein the opaque heat-conductive material comprises a metallic material.

14. An electronic display device as recited in claim 1, wherein the third layer comprises metallic foil having a thickness between 30 μm and 150 μm.

15. An electronic display device as recited in claim 1, wherein a cumulative light emitting area of the OLEDs in the two-dimensional pixel array is less than 20% of a total area of the layered monolithic sheet-form structure.

16. An electronic display device as recited in claim 1, wherein the layered monolithic sheet-form structure is flexible and bendable to a curved shape with a radius of surface curvature of 30 mm or less.

17. An electronic display device as recited in claim 1, wherein the least one transparent area is substantially free from the plurality of solid-state light emitting devices.

18. An electronic display device as recited in claim 1, further comprising a second fold area longitudinally extending along the major dimension of the layered monolithic sheet-form structure.

19. An electronic display device, comprising:
a layered sheet-form structure having a generally rectangular shape with rounded corners, a thickness of less than 1.5 mm, and a smooth outer surface, the layered sheet-form structure comprising:
  a first layer formed by a flexible sheet of an optically transmissive material having a substantially uniform thickness and a Young's modulus of at least 1 GPa;
  a second layer formed by a flexible sheet of an optically transmissive material having a substantially uniform thickness, the second layer being approximately coextensive in size with the first layer;
  a third layer being approximately coextensive in size with the first and second layers and comprising one or more sheets of an opaque heat-conductive material;
  a light emitting region having a generally rectangular area and comprising a plurality of solid-state light emitting devices arranged in a two-dimensional pixel array having a longer dimension from 10 centimeters to 30 centimeters and a pixel density of at least 300 pixels per inch, wherein the light emitting region comprises at least one million individually digitally addressable organic light emitting diodes (OLEDs) and has an area that is greater than 90% of a total area of the first layer;
  a first adhesive layer disposed on a front side of the two-dimensional pixel array; and
  a second adhesive layer disposed on a back side of the two-dimensional pixel array,
wherein the layered sheet-form structure hermetically encapsulates the two-dimensional pixel array,
wherein each of the OLEDs has a size from 1 micrometer to 300 micrometers,
wherein at least a portion of the layered sheet-form structure is substantially transparent or translucent, and
wherein the layered sheet-form structure is configured for repetitive and reversible folding upon itself with a radius of surface curvature of less than 5 mm.

20. An electronic display device as recited in claim 19, wherein the light emitting region is configured to emit light with a luminous emittance of 2500 $lm/m^2$ or more.

21. An electronic display device as recited in claim 19, wherein the layered sheet-form structure comprises a grid of electrical contacts formed by a transparent conductive oxide.

22. An electronic display device as recited in claim 19, wherein the two-dimensional pixel array is configured to emit light with luminous emittance values in a range having an upper bound of at least 2500 $lm/m^2$.

23. An electronic display device as recited in claim 19, wherein the two-dimensional pixel array is configured to emit light with luminous emittance values in a range having an upper bound from 3000 $lm/m^2$ to 150000 $lm/m^2$.

24. An electronic display device as recited in claim 19, further comprising a rectangular grid of optically opaque separation walls extending perpendicular to a plane of the layered sheet-form structure and defining a two-dimensional regular array of light control cells separating adjacent OLEDs from one another, each of the light control cells having a generally rectangular shape.

25. An electronic display device as recited in claim 19, further comprising a rectangular grid of optically opaque separation walls extending perpendicular to a plane of the layered sheet-form structure, wherein the optically opaque separation walls have a tapered shape in a cross-section.

26. An electronic display device as recited in claim 19, further comprising a rectangular grid of optically opaque separation walls extending perpendicular to a plane of the layered sheet-form structure, wherein the optically opaque separation walls have one or more curved surface.

27. An electronic display device as recited in claim 19, wherein the optically transmissive material of the first layer has a hardness of at least 6H on the Mohs scale.

28. An electronic display device as recited in claim 19, wherein the layered sheet-form structure has a thickness of less than 1 mm.

29. An electronic display device as recited in claim 19, wherein the layered sheet-form structure has a thickness of less than 0.75 mm.

30. An electronic display device as recited in claim 19, wherein the layered sheet-form structure has a thickness of less than 0.5 mm.

31. An electronic display device as recited in claim 19, wherein the opaque heat-conductive material comprises a metallic material.

32. An electronic display device as recited in claim 19, wherein the third layer comprises metallic foil having a thickness between 30 μm and 150 μm.

33. An electronic display device as recited in claim 19, wherein a cumulative light emitting area of the OLEDs in the two-dimensional pixel array is less than 20% of a total area of the layered sheet-form structure.

34. An electronic display device as recited in claim 19, wherein the layered sheet-form structure is flexible and bendable to a curved shape with a radius of surface curvature of 30 mm or less.

35. An electronic display device as recited in claim 19, wherein the substantially transparent or translucent portion of the layered sheet-form structure is substantially free from the plurality of solid-state light emitting devices.

36. An electronic display device as recited in claim 19, comprising a first fold area and a second fold area, the first and second fold areas longitudinally extending along the major dimension of the layered sheet-form structure.

* * * * *